US012107671B2

(12) United States Patent
Dror et al.

(10) Patent No.: US 12,107,671 B2
(45) Date of Patent: Oct. 1, 2024

(54) TIMESTAMPING OVER MEDIA INDEPENDENT INTERFACES

(71) Applicant: Marvell Israel (M.I.S.L) Ltd., Yokneam (IL)

(72) Inventors: Nitzan Dror, Ramot Hashavim (IL); Jeng-Jong Douglas Chen, Santa Clara, CA (US); Lenin Kumar Patra, Dublin, CA (US)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 18/114,171

(22) Filed: Feb. 24, 2023

(65) Prior Publication Data
US 2023/0269015 A1     Aug. 24, 2023

Related U.S. Application Data

(63) Continuation-in-part of application No. 17/976,658, filed on Oct. 28, 2022.
(Continued)

(51) Int. Cl.
*H04J 3/06* (2006.01)
(52) U.S. Cl.
CPC .......... *H04J 3/0661* (2013.01); *H04J 3/0682* (2013.01)
(58) Field of Classification Search
CPC ............................. H04J 3/0661; H04J 3/0682
See application file for complete search history.

(56) References Cited

U.S. PATENT DOCUMENTS 8,976,750 B1 * 3/2015 Pearson ............ H04W 56/0065
370/509
9,356,721 B2 5/2016 Haulin
(Continued)

FOREIGN PATENT DOCUMENTS

CN        112887045      * 11/2019
CN        112887045 A    6/2021
(Continued)

OTHER PUBLICATIONS

"LAN8814—4-Port Gigabit Ethernet Transceiver with QSGMII/Q-USGMII, IEEE 1588, SyncE and TSN Support," Microchip Technology Inc., 108 pages, Feb. 1, 2022.
(Continued)

*Primary Examiner* — Glenton B Burgess
*Assistant Examiner* — Patrick F Ngankam

(57) ABSTRACT

Timestamp circuitry of a network device modifies a packet by embedding a future timestamp in the packet to generate a timestamped packet. The future timestamp corresponds to a transmit time that occurs after the timestamp circuitry embeds the future timestamp in the packet. The timing information is added to the packet and the packet is then transferred to transmitter circuitry of the network device via a communication link, internal to the network device, that operates according to a media independent communication interface. Time gating circuitry of the transmitter circuitry i) holds the timestamped packet from proceeding to a network link coupled to the network device prior to a current time reaching the transmit time, and ii) releases the timestamped packet for transmission via the network link in response to the current time reaching the transmit time.

18 Claims, 7 Drawing Sheets

Related U.S. Application Data

(60) Provisional application No. 63/313,756, filed on Feb. 25, 2022, provisional application No. 63/313,293, filed on Feb. 24, 2022.

(56) References Cited

U.S. PATENT DOCUMENTS

| | | |
|---|---|---|
| 9,391,728 B2 | 7/2016 | Haulin |
| 9,929,928 B1 * | 3/2018 | Dekoos ................ H04L 41/147 |
| 10,084,559 B1 | 9/2018 | Devineni et al. |
| 2002/0021717 A1 | 2/2002 | Hedayat et al. |
| 2002/0039370 A1 * | 4/2002 | Elliot ................... H04J 3/0697 370/429 |
| 2003/0235216 A1 | 12/2003 | Gustin |
| 2004/0008973 A1 | 1/2004 | Marshall et al. |
| 2004/0141526 A1 | 7/2004 | Balasubramanian et al. |
| 2005/0286507 A1 | 12/2005 | Oesterling et al. |
| 2006/0164902 A1 | 7/2006 | Fung |
| 2007/0260906 A1 | 11/2007 | Corredoura |
| 2008/0273521 A1 | 11/2008 | Shao et al. |
| 2009/0310729 A1 | 12/2009 | Liu et al. |
| 2010/0162265 A1 | 6/2010 | Heddes |
| 2010/0223399 A1 | 9/2010 | Kim et al. |
| 2011/0228768 A1 | 9/2011 | Gelter et al. |
| 2012/0014377 A1 | 1/2012 | Joergensen et al. |
| 2013/0003757 A1 | 1/2013 | Boatright et al. |
| 2013/0208735 A1 | 8/2013 | Mizrahi et al. |
| 2013/0343409 A1 | 12/2013 | Haulin |
| 2014/0092918 A1 | 4/2014 | Jost |
| 2014/0153588 A1 | 6/2014 | Haulin |
| 2015/0333856 A1 | 11/2015 | Hayter et al. |
| 2016/0142329 A1 | 5/2016 | Sasak et al. |
| 2016/0294536 A1 | 10/2016 | Biederman |
| 2021/0297230 A1 | 9/2021 | Dror et al. |

FOREIGN PATENT DOCUMENTS

| | | | |
|---|---|---|---|
| DE | 102008026391 A1 | 12/2009 | |
| EP | 2254267 A1 | 11/2010 | |
| EP | 3840255 A1 * | 6/2021 | ............ H04J 3/0602 |
| WO | 2012065823 A1 | 5/2012 | |
| WO | 2013117997 A2 | 8/2013 | |
| WO | 2016070947 A1 | 5/2016 | |

OTHER PUBLICATIONS

Non-Final Office Action for U.S. Appl. No. 17/976,658, mailed on Sep. 25, 2023. (29 pages).

International Search Report and Written Opinion for PCT Patent Application No. PCT/US2023/013877 mailed Jun. 16, 2023. (14 pages).

International Search Report and Written Opinion for PCT Patent Application No. PCT/IB2023/051754, mailed Jun. 2, 2023. (15 pages).

Non-Final Office Action for U.S. Appl. No. 18/114,170, mailed Nov. 8, 2023. (30 pages).

Notice of Allowance for U.S. Appl. No. 18/114,170, mailed Apr. 18, 2024 (10 pages).

Notice of Allowance for U.S. Appl. No. 17/976,658, mailed Apr. 22, 2024 (10 pages).

* cited by examiner

TIMESTAMPING OVER MEDIA INDEPENDENT INTERFACES

CROSS REFERENCES TO RELATED APPLICATIONS

This application is a continuation-in-part of U.S. patent application Ser. No. 17/976,658, entitled "Dynamic One-Step/Two-Step Timestamping Per Packet in Network Devices," filed on Oct. 28, 2022, which claims the benefit of U.S. Provisional Patent App. No. 63/313,293, entitled "Dynamic ½ Step Timestamping in MCH Based PHY," filed on Feb. 24, 2022, and claims the benefit of U.S. Provisional Patent App. No. 63/313,756, entitled "Encrypted PTP Frames 1 Step Timestamping Over USXGMII/USGMII Interfaces," filed on Feb. 25, 2022. Additionally, this application claims the benefit of U.S. Provisional Patent App. No. 63/313,756, filed on Feb. 25, 2022, and claims the benefit of U.S. Provisional Patent App. No. 63/313,293, filed on Feb. 24, 2022. The disclosures of all of the applications referenced above are hereby expressly incorporated herein by reference in their entireties.

FIELD OF TECHNOLOGY

The present disclosure relates generally to communication networks, and more particularly to timestamping packets in a network device.

BACKGROUND

Clock synchronization protocols, such as the Precision Time Protocol (PTP), are commonly used in packet-based networks to synchronize clocks maintained at different network devices across a computer network. In such clock synchronization protocols, a first network device, which maintains a master clock, transmits a timing packet to a second network device, which maintains a slave clock. The first network device also transmits to the second network device a transmit timestamp that indicates when the first network device transmitted the timing packet. The second network device utilizes the transmit timestamp corresponding to the timing packet and an estimated network latency to adjust the slave clock in order to synchronize the slave clock with the master clock.

In a technique often referred to as "two-step timestamping," the first network device generates the transmit timestamp in connection with transmitting the timing packet, stores the transmit timestamp in a register, but does not include the transmit timestamp in the timing packet itself. Rather, the first network device includes the transmit timestamp corresponding to transmission time of the timing packet in a follow-up packet. Because the transmit timestamp is transmitted in a follow-up packet, two-step timestamping systems do not require "on—the fly" hardware that embeds the transmit timestamp into the timing packet itself. However, latency associated with the timing packets is increased because the second communication device cannot determine the transmit time of the timing packet until receiving the follow-up packet, which may reduce end-to-end accuracy of clocks in a network. Also, two-step timestamping requires the follow-up packet to be matched with a corresponding timing packet at the second network device, which increases implementation complexity and sometimes leads to synchronization errors when matching is performed incorrectly. Additionally, two-step timestamping requires transmission of additional packets, which increases overhead.

In a technique often referred to as "one-step timestamping," the first network device includes the transmit timestamp in the timing packet itself. Some one-step timestamping implementations involve hardware that is capable of embedding the transmit timestamp in the timing packet just prior to the first network device transmitting the timing packet so that the value of the transmit timestamp in the timing packet is very close to the actual time at which the timing packet was transmitted. Some one-step timestamping implementations increase hardware requirements, cost, and/or power consumption in network devices because a network device typically needs to perform parsing and timing computation operations with respect to packets at wire speed in order to embed timestamps or other timing information into timing packets on-the-fly as the timing packets are transmitted from the network device.

Some communication networks use security techniques to protect transmitted data from tampering and/or to obscure transmitted data from third parties. For example, a transmitting node may generate authentication data using contents of a packet (e.g., the transmitting node applies a hash function to contents of the packet to generate a hash value), and then includes the authentication data in the packet (or a subsequent packet). When a receiving node receives the contents of the packet and the authentication data, the receiving node regenerates the authentication data using the contents of the received packet, and compares the regenerated authentication data with the received authentication data. If the regenerated authentication data is different than the received authentication data, the receiving node may determine that the contents of the received packet are not accurate.

Similarly, a transmitting node may encrypt contents of a packet prior to transmitting the packet. The encryption obscures the content so that third parties cannot understand the meaning of the content. When a receiving node receives the packet, the receiving node decrypts the encrypted contents of the packet to obtain the original content. If the encrypted contents have been modified prior to reaching the receiving node, the decryption process will result in unintelligible information, and the receiving node will assume that the contents of the received packet are not accurate.

If a transmitting node adds a timestamp to a packet after the transmitting node has applied authentication/encryption to contents of the packet, the timestamp will not be protected by the authentication/encryption leaving the timestamp vulnerable to view/modification by a malicious third party. For example, a malicious third party may attempt to use/modify timestamps in transmitted packets to affect the timing of actions in a communication network.

On the other hand, if a transmitting node adds a timestamp to a packet prior to the transmitting node applying authentication/encryption to contents of the packet, the timestamp will not accurately reflect the transmit time of the packet because of variable latency caused by applying the authentication/encryption. Inaccurate timestamps, for instance due to variations in latency, will reduce the degree of synchronization of clocks in the communication network, which may adversely affect applications that require precise synchronization of clocks across the communication network.

SUMMARY

In an embodiment, a network device comprises: a packet processor that includes timestamp circuitry configured to modify a packet that is to be transmitted by the network device by embedding a future timestamp in the packet to generate a timestamped packet, the future timestamp corresponding to a transmit time at which the timestamped packet is to be transmitted by the network device, the transmit time occurring after the timestamp circuitry embeds the future timestamp in the packet, the packet processor being configured to add to the timestamped packet timing information that indicates the transmit time corresponding to the future timestamp; and transmitter circuitry coupled to the packet processor via a communication link that operates according to a media independent communication interface, the transmitter circuitry being configured to receive packets from the packet processor via the communication link and transmit the packets via the one or more network links, the packets including the timestamped packet with the timing information that indicates the transmit time corresponding to the future timestamp. The transmitter circuitry includes time gating circuitry that is configured to i) hold the timestamped packet from proceeding to one of the network links, among the one or more network links, prior to a current time reaching the transmit time, and ii) release the timestamped packet for transmission via the one network link in response to the current time reaching the transmit time.

In another embodiment, a method for transmitting packets in a network device includes: receiving, at a packet processor of a network device, a packet that is to be transmitted via a port of the network device; modifying, with timestamping circuitry of the packet processor, the packet by embedding a future timestamp in the packet to generate a timestamped packet, the future timestamp corresponding to a transmit time at which the timestamped packet is to be transmitted by the port, the transmit time occurring after the timestamping circuitry embeds the future timestamp in the packet; adding, by the packet processor, timing information to the timestamped packet, the timing information indicating the transmit time; transferring the timestamped packet from the packet processor to transmitter circuitry via a communication link that operates according to a media independent communication interface; determining, at the transmitter circuitry, when a current time reaches the transmit time; holding, at time gating circuitry of the transmitter circuitry, the packet from proceeding to the port prior to the current time reaching the transmit time; and releasing, by the time gating circuitry, the packet to the port in response to determining that the current time has reached the transmit time.

DETAILED DESCRIPTION

In embodiments described below, a network device includes a packet processor coupled to one or more physical layer (PHY) processors via one or more media independent and/or serial communication interfaces. The one or more PHY processors are in turn coupled to one or more network ports, in some embodiments. Timestamping circuitry in the packet processor embeds a future timestamp in a packet, the future timestamp corresponding to a future transmit time at which the packet is to be transmitted by the network device. The packet is transferred from the packet processor to a PHY processor via a media independent and/or serial communication interface. Time gating circuitry in the PHY processor receives the packet and compares a current time generated by a clock with the transmit time. The time gating circuitry prevents the packet from being transmitted prior to the current time reaching the future transmit time, and releases the packet for transmission when the current time reaches the future transmit time. Thus, the packet is transmitted at a time that closely corresponds to the timestamp in the packet, according to embodiments described below.

Figure 1:
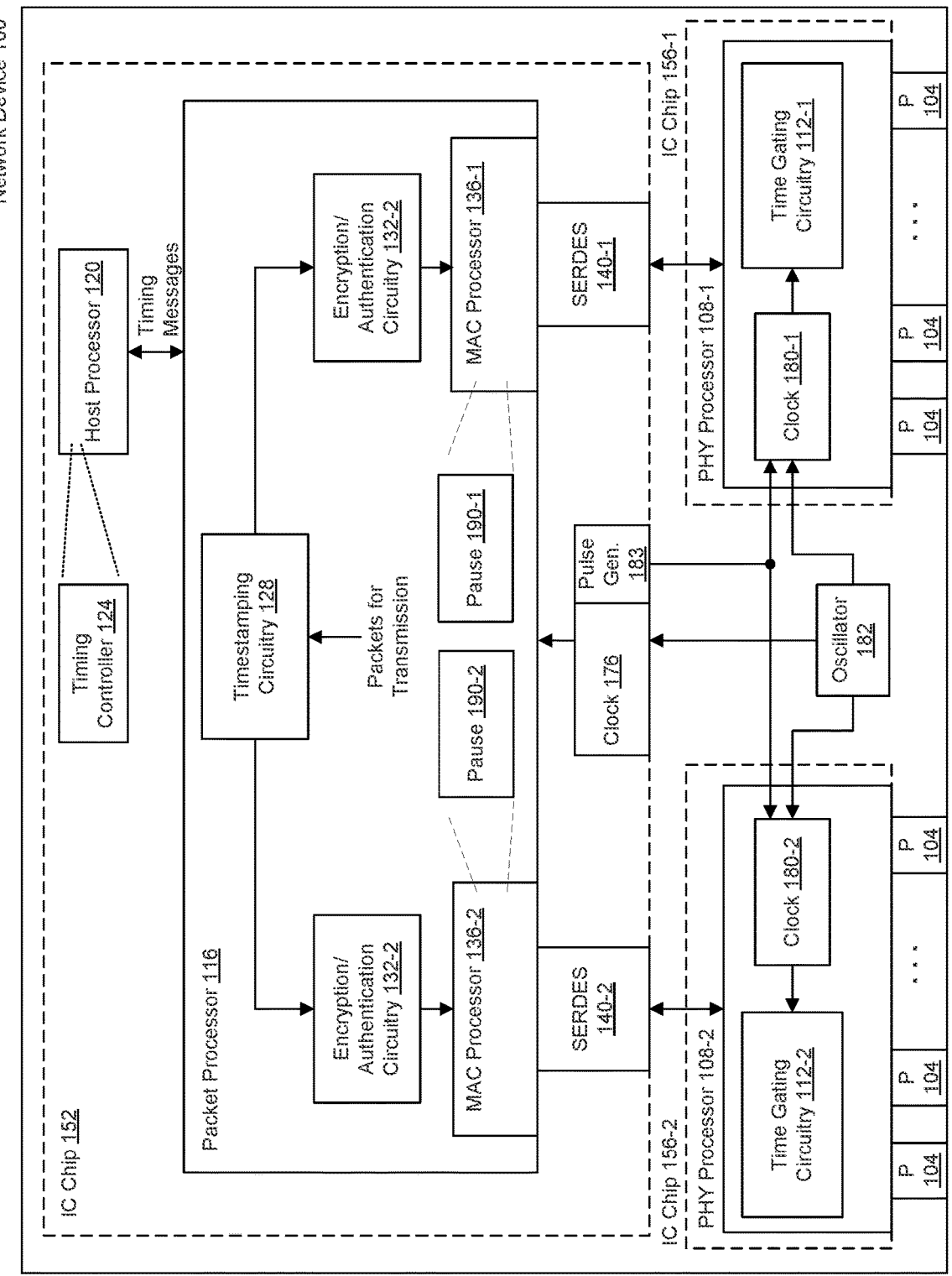
FIG. 1 is a simplified block diagram of an example network device configured to transmit timestamped packets in a network, according to an embodiment.

FIG. 1 is a block diagram of an example network device 100 configured to transmit timestamped packets in a network, according to an embodiment. The network device 100 is configured to operate according to a synchronization protocol for timing synchronization. In an embodiment, the network device 100 is configured to operate according to the Institute of Electrical and Electronics Engineers (IEEE) 802.1AS Standard. In another embodiment, the network device 100 is configured to operate according to another synchronization protocol, such as the IEEE 1588 standard, commonly referred to as the "Precision Time Protocol" or "PTP," the network time protocol (NTP), or another suitable synchronization protocol.

The network device 100 is configured to operate as an endpoint device that implements a master clock or a slave clock on the network, or a relay device that relays the master clock to one or more endpoint devices on the network, in various embodiments in which the network device 100 operates according to the IEEE 802.1AS Standard. Generally, the network device 100 is configured to generate timing packets and/or update timing information in received timing packets, and transmit the timing packets to the one or more other devices on the network to allow the one or more other devices to synchronize with the master clock on the network, in various embodiments. As used herein, the term "timing packets" refers to network data packets that include timing messages generated and transmitted by network devices in a network and used for conducting time related procedures in the network, such as clock synchronization between network devices in the network.

The network device 100 includes one or more network ports 104 configured to couple to respective one or more network links (not shown) for coupling the network device 100 to one or more other devices in a network. The network device 100 also includes one or more physical layer (PHY) processors 108 coupled to the one or more network ports 104, in an embodiment. Although the network device 100 is illustrated in FIG. 1 as having a respective PHY processor

108 that is coupled to a respective set of multiple network ports 104, each PHY processor 108 is coupled to a respective single network port 104, in some embodiments. In another embodiment, the network device 100 is a single port device that includes only a single PHY processor 108 coupled to a single port 104. The one or more PHY processors 108 are sometimes referred to herein as "the PHY processor 108" for brevity.

In various embodiments, the PHY processor 108 includes one of, or any suitable combination of two or more of, a digital-to-analog converter (DAC), an amplifier, a modulator, etc. (not shown), to convert a digital signal corresponding to a packet to an analog signal suitable for transmission via the a port 104. The PHY processor 108 also includes one of, or any suitable combination of two or more of, an analog-to-digital converter (ADC), an amplifier, a demodulator, etc. (not shown), to convert an analog signal corresponding to a packet that was received via the port 104 to a digital signal for processing by the network device 100.

The network device 100 also includes a packet processor 116 coupled to a host processor 120, in an embodiment. The packet processor 116 is implemented using one or more integrated circuits (e.g., one or more application-specific integrated circuits (ASICs)), in an embodiment. In an embodiment, the host processor 120 is, or is implemented by, a processing unit, such as a central processing unit (CPU) of the network device 100. In an embodiment, the host processor 120 is configured to implement computer readable instructions stored in a memory (not shown) of the network device 100. The packet processor 116 is also coupled to the one or more PHY processors 108. The packet processor 116 is configured to receive packets from the one or more PHY processors 108, to perform packet processing operations with respect to the packets received from the one or more PHY processors 108, e.g., one or more of: parsing headers of packets, de-capsulating packets, making forwarding decisions for packets, etc. For at least some packets received via the ports 104, the packet processor 116 transfers the packets to the host processor 120 for further processing, in an embodiment. For at least some other packets received via the ports 104, the packet processor 116 forwards to the packet to ports 104 for transmission from the network device 100, in an embodiment. In some embodiments, the packet processor 116 is also configured to receive messages from the host processor 120, to perform media access control (MAC) operations with respect to the messages received from the host processor 120, e.g., to encapsulate the messages with one or more protocol headers to generate packets, and to transfer the packets to appropriate one or more PHY processors 108 for transmission from the network device 100, in an embodiment.

Each PHY processor 108 corresponds to transmitter circuitry and receiver circuitry, i.e., transceiver circuitry. In some embodiments, each of at least some of the PHY processors 108 corresponds to transmitter circuitry and omits receiver circuitry.

In some embodiments and/or scenarios in which the network device 100 is operating as an endpoint device, the host processor 120 implements a timing controller 124 that is configured to generate timing messages originating from the network device 100. In other embodiments and/or scenarios in which the network device 100 is operating as an endpoint device, the packet processor 116 includes the timing controller 124. In an embodiment, the timing controller 124 is configured to generate PTP messages, such as PTP synchronization (Sync) messages, PTP delay request (Pdelay-Req) messages, PTP peer-to-peer delay response (Pdelay-Resp) messages, etc., in some embodiments. The timing controller 124 is configured to generate other suitable types of timing message, in other embodiments.

Prior to transmission of packets via the ports 104, the packets are processed by a plurality of processing stages of the packet processor. The plurality of processing stages are arranged in series, for instance as a processing pipeline, and process packets in an order, according to an embodiment. In some embodiments, the plurality of processing stages also includes one or more parallel branches in which respective processing stages selectively operate on a packet depending on the branch via which the packet traverses.

The plurality of processing stages includes timestamping circuitry 128 that is configured to modify a packet to embed a timestamp in the packet. The timestamp embedded in the packet by the time stamping circuitry 128 corresponds to a future time at which the packet is to be transmitted via a port 104 (sometimes referred to herein as a "transmit time" for a packet). For example, the future time (or transmit time) corresponds to a time offset added to a current time at which the packet is received at the time stamping circuitry 128. In an embodiment, the time offset corresponds to a maximum latency between the time offset being added to the packet by the timestamping circuitry 128 and the packet being transmitted via a port 104.

The time stamping circuitry 128 is also configured to generate timing information, separate from the timestamp in the packet, that indicates the transmit time, according to an embodiment. As will be discussed below, the timing information (separate from the timestamp in the packet) is for use by time gating circuitry 112 of the PHY processor 108. In particular, the time gating circuitry 112 uses the timing information to determine when a packet is to be released for transmission via the port 104, as will be described below.

In an embodiment, the time stamping circuitry 128 outputs the timing information separately from the packet, e.g., via a first output of the time stamping circuitry 128, which is separate from a second output of the time stamping circuitry 128 that outputs the packet that includes the timestamp. In another embodiment, the timing information is appended or otherwise added to the packet, e.g., in a tag appended or otherwise added to the packet, the tag being removed from the packet prior to transmitting the packet via the port 104 so that the tag is not transmitted via the port 104.

In some embodiments, the time stamping circuitry 128 does not timestamp every packet that is processed by the plurality of processing stages of the packet processor 116, e.g., the time stamping circuitry 128 selectively timestamps packets. For example, the packet processor 116 determines which packets are to be timestamped and informs the time stamping circuitry 128 of which packets are to be timestamped, according to an embodiment. In an embodiment, the time stamping circuitry 128 receives timestamping control information (e.g., from another component of the packet processor 116) separate from the packet but corresponding to the packet, the timestamping control information indicating whether the time stamping circuitry 128 is to timestamp the packet. In another embodiment, the timestamping control information (e.g., from another component of the packet processor 116) is appended to the packet, e.g., in a tag added to the packet. In an embodiment in which the packet received by the time stamping circuitry 128 includes a tag that indicates the packet is to be timestamped, the time stamping circuitry 128 modifies the tag to include the transmit time in the tag, and separate from the timestamp in the packet. In another embodiment in which the packet received by the time stamping circuitry 128 includes a tag that indicates the packet is to be timestamped, the time stamping circuitry 128 adds an additional tag to the packet, the additional tag including the transmit time. In another embodiment in which the packet received by the time stamping circuitry 128 includes a tag that indicates the packet is to be timestamped, the time stamping circuitry 128 removes the tag and adds a new tag to the packet, the new tag including the transmit time.

In an embodiment, when the timestamping control information indicates that the packet is to be timestamped, the time stamping circuitry 128 includes a timestamp in the packet as discussed above; on the other hand, when the timestamping control information indicates that the packet is not to be timestamped, the time stamping circuitry 128 does not include a timestamp in the packet.

In some embodiments, the timestamping control information indicates whether the time gating circuitry 112 is to hold the packet until the transmit time. For example, some types of timestamped packets have less stringent timestamp accuracy requirements and thus need not be held by the time gating circuitry 112. As another example, packets that do not include timestamps need not be held by the time gating circuitry 112.

In some embodiments, the time stamping circuitry 128 determines whether a timestamp should be added to packet and/or whether the time gating circuitry 112 is to hold the packet until the transmit time based on the packet itself. For example, the time stamping circuitry 128 determines whether a timestamp should be added to packet and/or whether the time gating circuitry 112 is to hold the packet until the transmit time based on a packet type of the packet.

The plurality of processing stages of the packet processor 116 also includes encryption and/or authentication circuitry 132 that is configured to i) generate authentication information for contents of the packet, including the timestamp embedded in the packet by the time stamping circuitry 128 and/or ii) encrypt contents of the packet, including the timestamp embedded in the packet by the time stamping circuitry 128. In an embodiment in which the plurality of processing stages includes encryption circuitry and in which the timing information is appended to the packet, the encryption circuitry is configured to encrypt contents of the packet without using the timing information appended to the packet. In an embodiment in which the plurality of processing stages includes authentication circuitry and in which the timing information is appended to the packet, the authentication circuitry is configured to generate authentication information for the packet without using the timing information appended to the packet.

The network device 100 also includes one or more media access control (MAC) processors 136 (referred to herein as "the MAC processor 136" for brevity). The MAC processor 136 is configured to receive packets from the one or more PHY processors 108, to perform MAC operations with respect to the packets received from the one or more PHY processors 108 (e.g., one or more of detecting and removing preambles, parsing of headers, error checking, flow control operations, etc.), and to transfer the packets to other components of the packet processor 116 for further processing, in an embodiment. The MAC processor 118 is also configured to receive packets from other components of the packet processor, to perform MAC operations with respect to the packets (e.g., one or more of adding preambles to packets, formatting packet data according to a media independent interface format, flow control operations, etc.), and to transfer the packets to appropriate one or more PHY processors 108 for transmission from the network device 100, in an embodiment.

Each MAC processor 136 is coupled to a respective PHY processor 108 via a communication link that is internal to the network device 100. In some embodiments, each communication link comprises a serial communication link. In some such embodiments, network device 100 includes a respective serializer-deserializer (SERDES) 140 for each MAC processor 136 that is configured to receive packet data in a parallel format from the MAC processor 136 and convert the data in the parallel format into serial data, which is then transferred to the PHY processor 108 via the serial communication link. Similarly, the SERDES 140 is configured to receive serial packet data from the PHY processor 108 via the serial communication link and convert the serial packet data to packet data in a parallel format, which is then transferred to the MAC processor 136.

In an embodiment, the communication links that couple PHY processors 108 to respective MAC processors 136 comprise media-independent interfaces, such as the universal serial 10 gigabit Ethernet media-independent interface (USXGMII), the universal serial gigabit Ethernet media-independent interface (USGMII), or another suitable media-independent interface. In some embodiments in which a PHY processor 108 couples to multiple ports 104, the communication link that couples the PHY processor 108 to the MAC processor 136 carries interleaved data for multiple ports 104.

The packet processor 116 and the MAC processors 136 are implemented on a first integrated circuit (IC) chip 140, and the PHY processors 108 are implemented on respective second IC chips 156. In an embodiment, the host processor 120 is implemented on a third IC chip separate from the first IC chip 152 and the second IC chips 156. For example, the host processor 120 is communicatively coupled to the packet processor 116 via a suitable communication interface such as a Peripheral Component Interconnect Express (PCIe) interface, a Serial Management Interface (SMI), or another suitable interface. In another embodiment, the host processor 120 is an embedded processor included on the first IC chip 152.

In other embodiments, at least one MAC processor 136 and at least one of the PHY processor 108 are implemented on a single IC chip. In another embodiment, the packet processor 116, at least one MAC processor 120, and at least one of the PHY processor 108 are implemented on a single IC chip.

The packet processor 116 includes or is coupled to a clock 176 that generates a clock signal for the packet processor 116. Additionally, each PHY processors 108 includes a respective clock 180 that generates a respective clock signal for the PHY processor 108. The clock 176 and the clocks 180 are driven by a common oscillator 182 so that the clock 176 and the clocks 180 are synchronized in frequency. In an embodiment, phases of the clock 176 and the clocks 180 are also synchronized. For example, the clock 176 includes a pulse generator 183 that generates pulses that are synchronized with respective clock edges (e.g., a rising edge or a falling edge) of the clock 176, and the clocks 180 use the pulses to align the phases of the clocks 180 to the local-domain clock 176, according to an embodiment. The pulse generator 183 generates pulses at a suitable frequency such as 1 Hz or another suitable frequency. In other embodiments, the pulse generator 183 is included in one of the clocks 180, and the clock 176 and the other clocks 180 uses the pulses to align the phases to the one clock 180.

In an embodiment, the packet processor 116 and the PHY processors 108 further synchronize times maintained by the clock 176 and the clocks 180. In another embodiment, a single clock is supplied to the packet processor 116 and the PHY processors 108.

The clock 176 is used by the timestamping circuitry 128 to generate timestamps and timing information associated with the timestamps as discussed above. The clocks 180 are used by respective time gating circuitry 112 to determine when packets should be released from the PHY processors 108 for transmission, in an embodiment.

Figure 2:
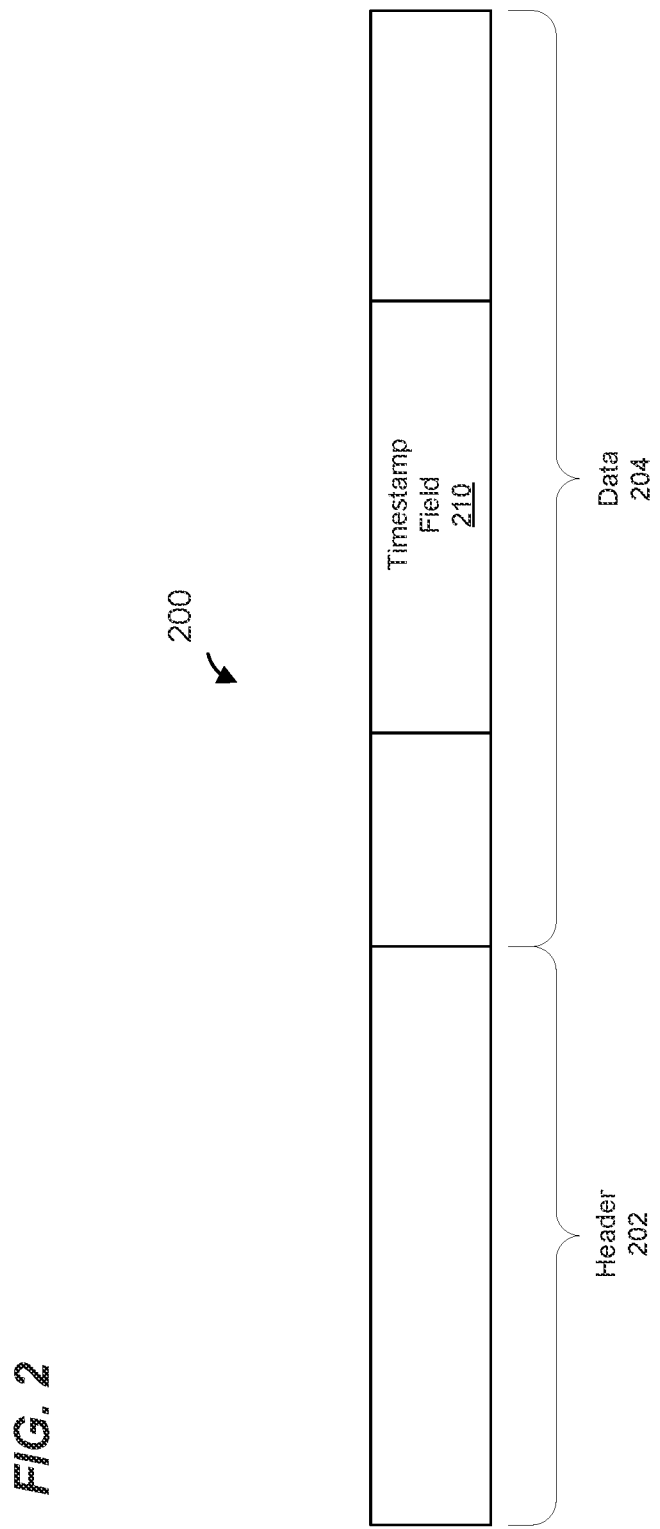
FIG. 2 is a simplified diagram of an example timing message that is processed by the network device of FIG. 1, according to an embodiment.

Referring briefly to FIG. 2, an example timing message 200 corresponds to a packet to which the timestamping circuitry 128 adds a timestamp, in an embodiment. The timing message 200 includes a header 202 and a data portion 204. The data portion 204 includes a timestamp field 208. In some embodiments, the data portion 204 includes one or more fields in addition to the timestamp field 208.

Referring now to FIGS. 1 and 2, in an embodiment, the timestamping circuitry 128 is configured to set the timestamp field 208 to a time in the future at which the packet is to be transmitted via the port 104, the time in the future having been determined by the timestamping circuitry 128 based on a current value of the host clock 128.

Referring now to FIG. 1, the timestamping circuitry 128 includes control header generation circuitry (not shown) that is configured to generate a control header for each of at least some timing messages and/or packets, the control header including information that indicates whether the time gating circuitry 112 is to hold the packet until transmit time, in an embodiment. For example, the control header generation circuitry is configured to generate the control header to include i) a first field having a value that indicates whether the time gating circuitry 112 is to hold the packet until a transmit time, and ii) a second field having a value that indicates the transmit time (at least when the first field indicates that the time gating circuitry 112 is to hold the packet until a transmit time). In another embodiment, the control header generation circuitry is configured to generate the control header to include a field having a value that indicates a transmit time until which the time gating circuitry 112 is to hold the packet, where setting the field to a predetermined value indicates that the time gating circuitry 112 should not hold the packet until a transmit time.

In other embodiments, the control header generation circuitry is included in the MAC processor 136.

Figure 3A:
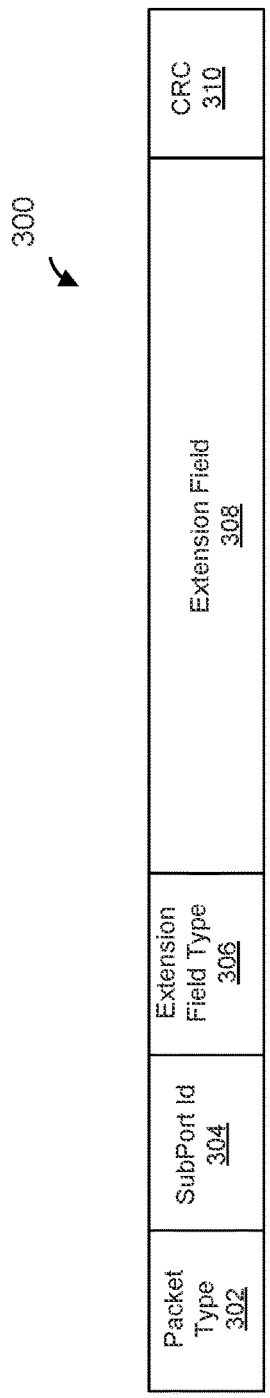
FIGS. 3A-C are simplified diagrams of example control headers of timing messages processed by the network device of FIG. 1, according to various embodiments.

FIG. 3A is a simplified diagram of an example control header 300 that is generated by the control header generation circuitry, according to an embodiment. In an embodiment, the control header 300 generally conforms to a known control header format specified for a media independent interface, such as the USXGMII or the USGMII. However, the control header 300 is modified with respect to known control header format specified for a media independent interface, in an embodiment. The control header 300 includes a packet type field 302, a SubPort Identifier (Id) field 304, and extension field type indicator field 306, an extension field 308 and a cyclic redundancy check (CRC) field 310, in the illustrated embodiment. In various embodiments, the control header 300 omits one or more of the fields 302-310 illustrated in FIG. 3A and/or includes one or more additional fields not illustrated in FIG. 3A.

In an embodiment, the control header generation circuitry is configured to generate the control header 300 for a packet that is to be transmitted by the network device 100, and to add the control header 300 to the timing message.

Figure 3B:
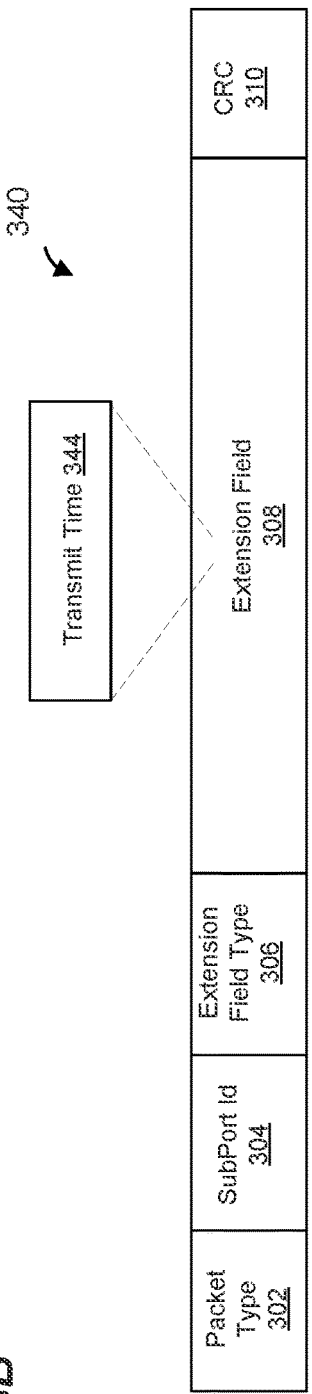

FIG. 3B is a simplified diagram of another example control header 340 that is included in a packet, according to another embodiment. The control header 340 is similar to the example control header 300 of FIG. 3A and like-numbered elements are not described in detail for purposes of brevity. In an embodiment, the control header 340 is the control header 300 after the control header 300 has been modified.

In an embodiment, the control header generation circuitry is configured to generate the control header 340 for a packet, and to insert the control header 340 at a predetermined location within the packet. For example, the control header generation circuitry is configured to replace, with the control header 340, at least a portion of a preamble at a beginning of the packet.

The control header generation circuitry is configured to include, in the extension field 308 of the control header 340, an indication of a transmit time at which the packet is to be transmitted via a port 104 of the network device 100. The control header generation circuitry is also configured to set a value of the extension field type field 306 to indicate that the extension field 308 includes an indication of the transmit time at which the packet is to be transmitted. In various embodiments, the indication of the transmit time occupies a suitable quantity of bits of the extension field 308.

In another embodiment, the packet processor 116 is configured to modify a control header 300 already included in a packet so that the control header has a format like the control header 340 of FIG. 3B. For example, the packet processor 116 is configured to include, in the extension field 308 of the control header 340, an indication of a transmit time at which the packet is to be transmitted via a port 104 of the network device 100. The control header generation circuitry (or another component of the packet processor 116) is also configured to set a value of the extension field type field 306 to indicate that the extension field 308 includes an indication of the transmit time at which the packet is to be transmitted. In various embodiments, the indication of the transmit time occupies a suitable quantity of bits of the extension field 308.

Figure 3C:
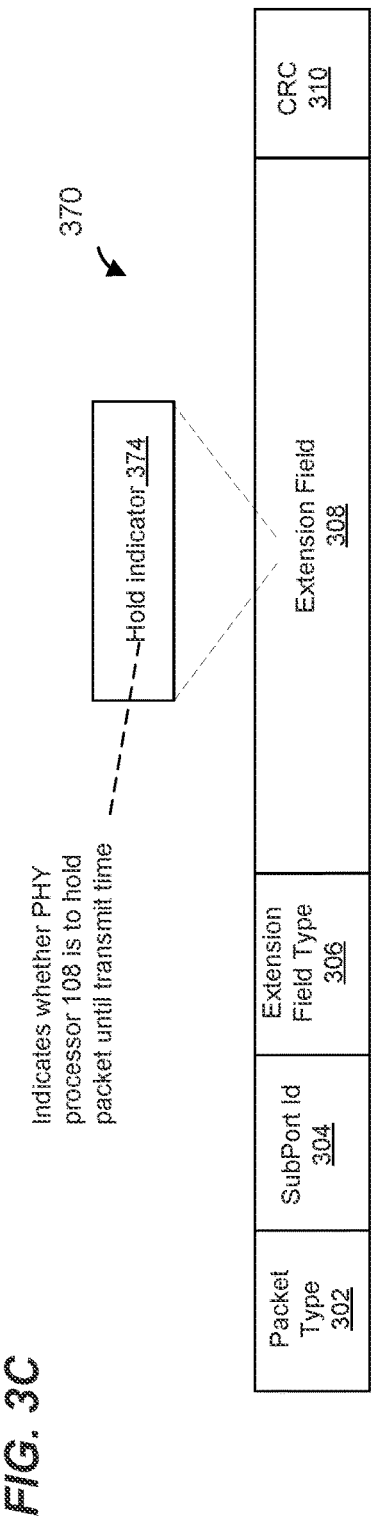

FIG. 3C is a simplified diagram of another example control header 370, according to another embodiment. The control header 370 is similar to the example control header 300 of FIG. 3A and the example control header 340 of FIG. 3B, and like-numbered elements are not described in detail for purpose of brevity. In an embodiment, the control header 370 is generated to have the format illustrated in FIG. 3C. In another embodiment, the control header 370 is the control header 300 after the control header 300 has been modified. In another embodiment, the control header 370 is the control header 340 after the control header 340 has been modified.

Referring to FIG. 1, the packet processor 116 is configured to insert the control header 370 into a timing packet corresponding to a timing message received from the host processor 120 prior to transferring the timing packet to a PHY processor (e.g., the PHY processor 108-2) for transmission of the timing packet via a network port 104 (e.g., the network port 104-2), in an embodiment. In an embodiment, the control header 370 is inserted into the timing packet at a predetermined location within the timing packet. For example, the control header 370 replaces a preamble at a beginning of the timing packet, in an embodiment. In another embodiment, the packet processor 116 is configured to modify a control header (e.g., the control header 300 or the control header 340) already present in the packet to generate the control header 370. For example, the packet processor 116 is configured to modify the control header 300 or the control header 340 of a packet prior to transferring the packet to a PHY processor 108 for transmission of the timing packet via a port 104, in an embodiment.

The extension field 308 of the control field 370 is generated, or modified, to include a hold indicator field 374, in an embodiment. In an embodiment, the control generation circuitry is configured to generate the control header 370 having the hold indicator field 374 for packet, and to add the control header 370 to the packet. In another embodiment, the packet processor 116 is configured to modify a control header already in a packet so that the hold indicator field 374 is set to a desired value.

The hold indicator field 374 includes information that indicates whether the PHY processor 108 is to hold the packet until the transmit time that is also indicated in the control header 370, e.g., in the transmit time field 344. For example, the control header generation circuitry is configured to generate the hold indicator field 374 to include a value that indicates whether the packet processor 108 is to hold the packet until the transmit time that is also indicated in the control header 370, e.g., in the transmit time field 344. In an embodiment, the control header generation circuitry (or another component of the packet processor 116) sets the hold indicator field 374 to a first value to indicate that the packet processor 108 is to hold the packet until the transmit time, and sets the hold indicator field 374 to a second value to indicate that the packet processor 108 is not to hold the packet until the transmit time, i.e., the packet processor 108 should transmit the packet whenever the packet processor 108 is ready to transmit the packet.

In an embodiment, the hold indicator field 374 is included in a timestamping type field 374 that also includes information that indicates whether the packet is to be processed using one-step timestamping or using two-step timestamping, in an embodiment. For example, the timestamping circuitry 128 (FIG. 1) is configured to generate the timestamping type field to include a value that indicates whether the timing packet is to be processed using one-step timestamping or using two-step timestamping.

When the PHY processor 108 receives a packet having the control header 370, the PHY processor 108 is configured to determine, at least by analyzing the hold indicator field 304, whether the PHY processor 108 is to hold the packet until a transmit time indicated in the control header 370, e.g., in the transmit time field 344, according to an embodiment. When the PHY processor 108 determines that the PHY processor 108 is to hold the packet until a transmit time, the PHY processor 108 is configured to determine the transmit time based transmit time information in the control header 370, e.g., in the transmit time field 344.

In various other embodiments, one or more of the timestamping circuitry 128, the encryption/authentication circuitry 132, and/or the control header generation circuitry is included in the MAC processor 136.

In an embodiment, the MAC processor 136 is configured to, in response to sending, via the SERDES 140 and the communication link, a packet to the PHY processor 108 that is to be held by the PHY processor 108 until the transmit time, pause sending a next packet to the PHY processor 108 for a delay time period to prevent a buffer overflow at the PHY processor 108, for example. In an embodiment, the delay period is determined based on a time offset between the timestamp in the packet and the time at which the timestamp was added to the packet. In an embodiment, the delay period is determined based on a maximum latency corresponding to when the timestamp is added to the packet by the timestamping circuitry 128 and when the packet is transmitted via a port 104. In an embodiment, pause circuitry 190 of the MAC processor 136 is configured to, in response to the MAC processor 136 sending, via the SERDES 140 and the communication link, a packet to the PHY processor 108 that is to be held by the PHY processor 108 until the transmit time, cause the MAC processor 136 to pause sending a next packet to the PHY processor 108 for the delay time period.

Figure 4:
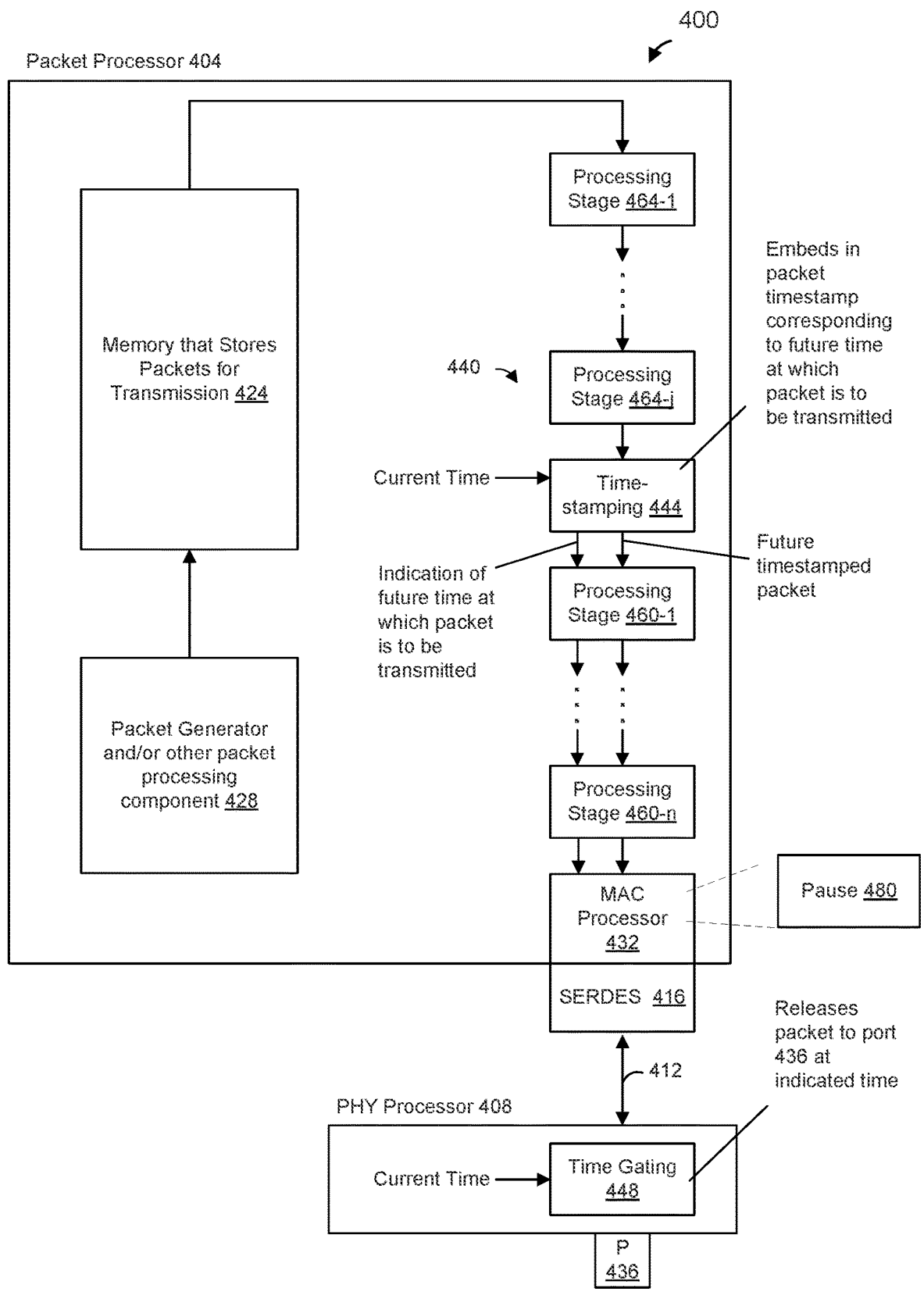
FIG. 4 is a simplified block diagram of another example network device configured to transmit timestamped packets in a network, according to another embodiment.

FIG. 4 is a simplified diagram of another example network device 400 that transmits timestamped packets in a communication network, according to another embodiment. In some embodiments, the network device 400 is an endpoint device that generates and transmits packets in a communication network. Illustrative examples of endpoint devices include a personal computer, a tablet computer, a mobile communication device, a sensor device, an industrial device in a factory, etc. In other embodiments, the network device 400 is a forwarding device that receives packets and forwards the packets via a plurality of network interfaces such as ports. Illustrative examples of forwarding devices include switches, routers, bridges, repeaters, access points, etc. In some embodiments, the network device 400 is the same as or similar to the network device 100 of FIG. 1. In other embodiments, the network device 400 is a suitable network device different than the network device 100 of FIG. 1.

The network device 400 includes a packet processor 424 coupled to a PHY processor 408 via a suitable communication link 412 such as a serial communication link. In some embodiments in which the communication link 412 is a serial communication link, the network device 400 includes a SERDES 416 for use by the packet processor 404 to communicate with the PHY processor 408 via the serial communication link 412.

Each PHY processor 408 corresponds to transmitter circuitry and receiver circuitry, i.e., transceiver circuitry. In some embodiments, each of at least some of the PHY processors 408 corresponds to transmitter circuitry and omits receiver circuitry.

The packet processor 404 includes a memory 424 to store packets that are to be transmitted by the network device 400. For example, the memory 424 may act as a transmit queue for storing packets until a communication link is available for transmitting the packets. In various embodiments, the memory 424 comprises a random access memory (RAM) or another suitable type of memory device.

The packet processor 404 also includes a packet generator and/or other packet processing component 428 (sometimes referred to herein as the "packet generator 428" for brevity). For example, when the network device 400 is an endpoint device, the network device 400 includes a packet generator 428 that generates the packets for transmission and stores the packet in the memory 404, according to an embodiment. As another example, when the network device 400 is a forwarding device, the network device 400 includes a forwarding engine (an example of a packet processing component 428) that analyzes at least headers of packets received by the network device 400 to determine network interfaces (e.g., ports) of the network device 400 via which the packets are to be transmitted, according to an embodiment. In some embodiments, the packet processing component 428 modifies packets stored in the memory 424, such as modifying headers of packets in the memory 424.

The network device 400 also includes a MAC processor 432 coupled to the communication link 412 via the SERDES 416. The MAC processor 432 is the same as or similar to the MAC processor 136 of FIG. 1. In an embodiment, the communication link 412 operates according to a media independent interface such as the USXGMII, the USGMII, etc.

Packets read from the memory 424 are provided to the PHY processor 408 for transmission via a port 436. Prior to transmission via the port 436, packets read from the memory 424 are processed by a plurality of processing stages 440. The plurality of processing stages 440 are arranged in series, for instance as a processing pipeline, and process packets in an order, according to an embodiment. In some embodiments, the plurality of processing stages 440 also includes one or more parallel branches (not shown) in which respective processing stages selectively operate on a packet depending on the branch via which the packet traverses.

In an embodiment, a direct memory access (DMA) circuit (not shown) reads packets from the memory 424 and provides the packets to the plurality of processing stages 440.

The plurality of processing stages 440 includes time stamping circuitry 444 that is configured to modify a packet to embed a timestamp in the packet. The timestamp embedded in the packet by the time stamping circuitry 444 corresponds to a future time at which the packet is to be transmitted via the port 436 (sometimes referred to herein as a "transmit time" for a packet). For example, the future time (or transmit time) corresponds to a time offset added to a current time at which the packet is received at the time stamping circuitry 444, where the time offset corresponds to a maximum latency of a packet being processed by the timestamping circuitry 444 and being transmitted by via the port 436.

The time stamping circuitry 444 is also configured to generate timing information, separate from the timestamp in the packet, that indicates the transmit time, according to an embodiment. As will be discussed below, the timing information (separate from the timestamp in the packet) is for use by time gating circuitry 448 in the PHY processor 408. In particular, the time gating circuitry 448 uses the timing information to determine when a packet is to be released to the port 436, as will be described below.

In an embodiment, the time stamping circuitry 444 outputs the timing information in a tag that is appended to (or otherwise included in) the packet, e.g., in a tag appended to (or otherwise included in) the packet, the tag being removed from the packet prior to transmitting the packet via the port 436 so that the tag is not transmitted via the port 436.

In some embodiments, the time stamping circuitry 444 does not timestamp every packet that is processed by the plurality of processing stages 440, e.g., the time stamping circuitry 444 selectively timestamps packets. For example, the packet generator 428 determines which packets are to be timestamped and informs the time stamping circuitry 444 of which packets are to be timestamped, according to an embodiment. In an embodiment, the time stamping circuitry 444 receives timestamping control information (e.g., from the packet generator 428) separate from the packet but corresponding to the packet, the timestamping control information indicating whether the time stamping circuitry 444 is to timestamp the packet. In another embodiment, the timestamping control information (e.g., from the packet generator 428) is added to the packet, e.g., in a tag added to the packet. In an embodiment in which the packet received by the time stamping circuitry 444 includes a tag that indicates the packet is to be timestamped, the time stamping circuitry 444 modifies the tag to include the transmit time in the tag, and separate from the timestamp in the packet. In another embodiment in which the packet received by the time stamping circuitry 444 includes a tag that indicates the packet is to be timestamped, the time stamping circuitry 444 adds an additional tag to the packet, the additional tag including the transmit time. In another embodiment in which the packet received by the time stamping circuitry 444 includes a tag that indicates the packet is to be timestamped, the time stamping circuitry 444 removes the tag and adds a new tag to the packet, the new tag including the transmit time.

In an embodiment, when the timestamping control information indicates that the packet is to be timestamped, the time stamping circuitry 444 includes a timestamp in the packet as discussed above; on the other hand, when the timestamping control information indicates that the packet is not to be timestamped, the time stamping circuitry 444 does not include a timestamp in the packet.

In an embodiment, when the timestamping control information indicates that the packet is not to be timestamped, the time stamping circuitry 444 generates the timing information to be used by the time gating circuitry 448 (as discussed above) so that the time gating circuitry 448 immediately releases the packet to the port 436. For example, when the timestamping control information indicates that the packet is not to be timestamped, the time stamping circuitry 444 generates the timing information to indicate the current time or a past time, according to an embodiment. In another embodiment, when the timestamping control information indicates that the packet is not to be timestamped, the time stamping circuitry 444 sets the timing information to a predetermined value that indicates to the time gating circuitry 448 that the time gating circuitry 448 should immediately release the packet to the port 436.

In another embodiment, the timestamping control information is also provided to the time gating circuitry 448, and when the timestamping control information indicates that the packet is not to be timestamped, the time gating circuitry 448 immediately releases the packet to the port 436.

The time gating circuitry 448 is configured to i) receive the packet that is to be transmitted via the port 436, ii) receive the timing information (which indicates the transmit time for the packet) from the time stamping circuitry 444, iii) hold the packet from proceeding to the port 436 prior to a current time reaching the transmit time, and iv) release the packet to the port 436 in response to the current time reaching the transmit time, according to an embodiment. Because the time gating circuitry 448 releases the packet to the port 436 when the current time reaches the transmit time (which corresponds to the timestamp in the packet), the timestamp in the packet more accurately reflects the actual transmit time of the packet.

In some embodiments in which the timestamping circuitry 444 adds the timing information to the packet, e.g., in a tag added to the packet, the time gating circuitry 448 is configured to remove the added timing information from the packet prior to releasing the packet to the port 436.

In an embodiment, when the timing information is set to a predetermined value that indicates to the time gating circuitry 448 that the time gating circuitry 448 should immediately release the packet to the port 436, the time gating circuitry 448 immediately releases the packet to the port 436.

In another embodiment, when the time gating circuitry 448 receives timestamping control information (such as described above), and when the timestamping control information indicates that the packet is not to be timestamped, the time gating circuitry 448 immediately releases the packet to the port 436.

The plurality of processing stages 440 includes one or more post-timestamping processing stages 460 between the time stamping circuitry 444 and the SERDES 416. In an embodiment, the one or more post-timestamping processing stages 460 includes authentication circuitry that is configured to generate authentication information for contents of the packet, including the timestamp embedded in the packet by the time stamping circuitry 444. In an embodiment, the authentication circuitry is configured to embed the authentication information in the packet. In another embodiment, the authentication circuitry is configured to embed the authentication information in a subsequent packet.

In another embodiment, the one or more post-timestamping processing stages 460 additionally or alternatively includes encryption circuitry that is configured to encrypt contents of the packet, including the timestamp embedded in the packet by the time stamping circuitry 444.

In other embodiments, the one or more post-timestamping processing stages 460 additionally or alternatively includes other suitable circuitry that performs other suitable processing of the packet.

In some embodiments, the plurality of processing stages 440 includes one or more pre-timestamping processing stages 464 prior to the time stamping circuitry 444. In an embodiment, one of the one or more pre-timestamping processing stages 464 includes a DMA circuit that reads packets from the memory 424 and provides the packets to the plurality of processing stages 440.

In an embodiment, the time stamping circuitry 444 includes the transmit time in a control header such as described with reference to FIGS. 3A-C. In another embodiment, the MAC processor 432 includes the transmit time in a control header such as described with reference to FIGS. 3A-C.

In some embodiments in which the MAC processor 432 includes the transmit time in the control header, the timing information generated by the timestamping circuitry 444 is provided to the MAC processor 432 via the one or more processing stages 460. For example, the processing stage(s) 460 include respective circuitry for forwarding the timing information to a next processing stage in the plurality of processing stages 440 so that the timing information is synchronized with the future timestamped packet. In some embodiments, the processing stage(s) 460 include respective registers, buffers, etc., for temporarily storing the timing information.

As another example, the timing information is added to the future timestamped packet by the timestamping circuitry 444 (as discussed above), and the timing information is passed through the one or more processing stages 460 added to the future timestamped packet. In an embodiment in which the one or more processing stages 460 includes authentication circuitry and in which the timing information is added to the packet, the authentication circuitry is aware that the timing information will not be transmitted with the packet, and the authentication circuitry is configured to generate authentication information for the packet without using the timing information added to the packet. In an embodiment in which the one or more processing stages 460 includes encryption circuitry and in which the timing information is added to the packet, the encryption circuitry is aware that the timing information will not be transmitted with the packet, and the encryption circuitry is configured to encrypt contents of the packet without using the timing information added to the packet.

In other embodiments, the timing information generated by the timestamping circuitry 444 bypasses the one or more processing stages 460 via a path separate from the one or more processing stages 460. In some such embodiments, the MAC processor 432 includes memory (e.g., a register, a buffer, etc.) for storing the timing information until the future timestamped packet is received by the MAC processor 432; and the MAC processor 432 includes circuitry for logically linking the timing information stored in the memory with the future timestamped packet when the future timestamped packet is received by the MAC processor 432.

Although one port 436 and one communication link 412 is illustrated in FIG. 4, in other embodiments, the network device 400 comprises a plurality of ports 104 coupled to one or more MAC processors 432 via one or more communication links 412. In some embodiments in which the network device 400 comprises a plurality of ports 436 coupled to one or more MAC processors 432 via one or more communication links 412, the network device 400 includes one or more sets of processing stages 440 (e.g., each including a time stamping circuit 444) for respective ones of the one or more MAC processors 432.

In some embodiments, the transmit time output by the timestamping circuitry 444 is adjusted with respect to the timestamp embedded in the packet. For example, to account for a known delay (e.g., a fixed, known delay) after the time gating circuitry 448 (e.g., including a fixed, known delay through the port 436), the timestamping circuitry 444 adjusts the transmit time output by the timestamping circuitry 444 to be earlier than the timestamp embedded in the packet to account for the known delay, e.g., through the port 436.

In other embodiments, the timestamping circuitry 444 does not adjust the transmit time output by the timestamping circuitry 444 with respect to the timestamp embedded in the packet.

In an embodiment, the MAC processor 432 or one of the processing stages 440 includes a control header (such as described above with reference to FIGS. 3A-C) in a preamble of the packet; and the time gating circuitry 448 is configured to retrieve the transmit time from the control header in the preamble of the packet.

In an embodiment, the MAC processor 432 is configured to, in response to sending, via the SERDES 416 and the communication link 412, a packet to the PHY processor 408 that is to be held by the PHY processor 408 until the transmit time, pause sending a next packet to the PHY processor 408 for a delay time period to prevent a buffer overflow at the PHY processor 408, for example. In an embodiment, the delay period is determined based on a time offset between the timestamp in the packet and the time at which the timestamp was added to the packet. In an embodiment, the delay period is determined based on a maximum latency corresponding to when the timestamp is added to the packet by the timestamping circuitry 444 and when the packet is transmitted via a port 436. In an embodiment, pause circuitry 480 of the MAC processor 432 is configured to, in response to the MAC processor 432 sending, via the SERDES 416 and the communication link 412, a packet to the PHY processor 408 that is to be held by the PHY processor 408 until the transmit time, cause the MAC processor 432 to pause sending a next packet to the PHY processor 408 for the delay time period.

Figure 5:
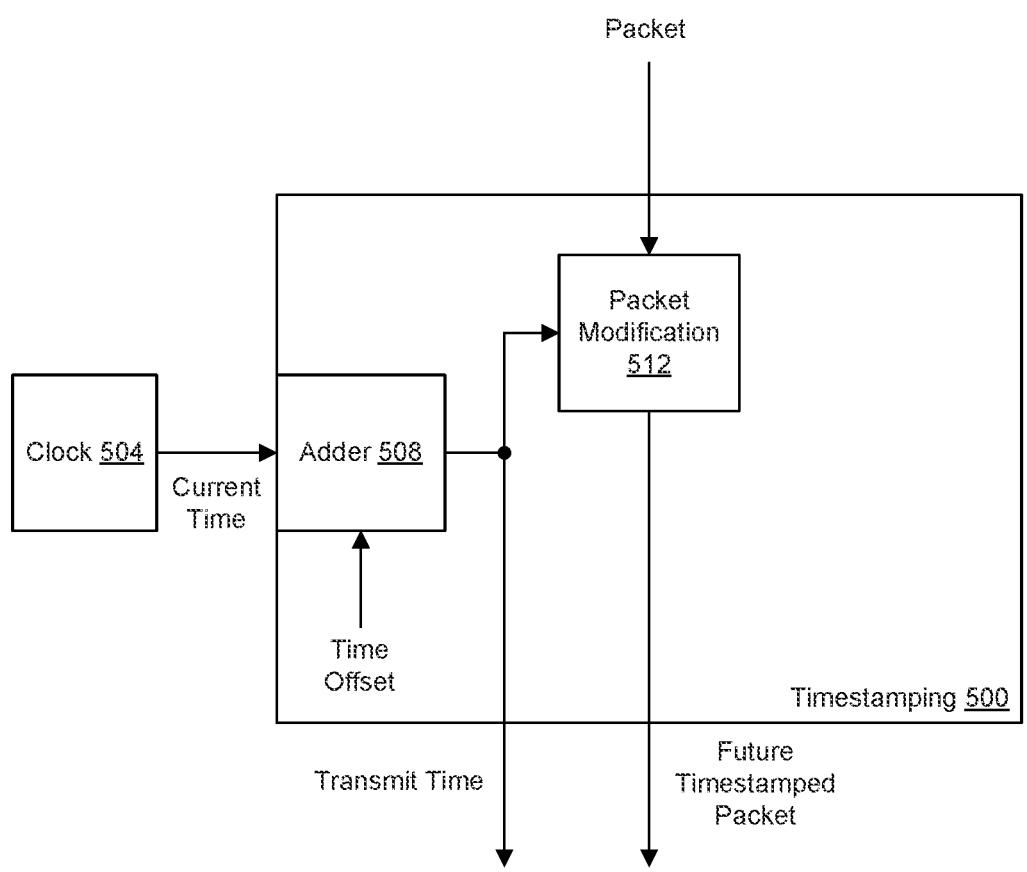
FIG. 5 is a diagram of example timestamping circuitry for adding a timestamp to a packet, the timestamp corresponding to a future time at which the packet is to be transmitted, according to an embodiment.

FIG. 5 is a diagram of example timestamping circuitry 500 for adding a timestamp to a packet, the timestamp corresponding to a future time at which the packet is to be transmitted, according to an embodiment. The timestamping circuitry 500 is included in the timestamping circuitry 128 of FIG. 1, according to an embodiment. The timestamping circuitry 500 is included in the timestamping circuitry 444 of FIG. 4, according to another embodiment. In other embodiments, the timestamping circuitry 500 is included in another suitable network device other than the network device 100 of FIG. 1 and the network device 400 of FIG. 4.

The timestamping circuitry 500 is coupled to, or includes, a clock circuit 504, and receives a current time value generated by the clock circuit 504. For example, the clock circuitry 504 corresponds to the clock 176 of FIG. 1, in an embodiment.

The timestamping circuitry 500 also includes an adder circuit 508 that is configured to add a time offset to the current time from the clock circuit 204 to generate a future time value corresponding to a time at which the packet is to be transmitted (e.g., a transmit time). The time offset corresponds to a maximum latency corresponding to transmitting the packet via a port (e.g., one of the ports 104 of FIG. 1, the port 436 of FIG. 4, etc.) of the network device after the time stamping circuitry 500 embeds the timestamp in the packet.

The timestamping circuitry 500 also includes a packet modification circuit 512 that is configured to modify the packet to include (or embed) in the packet a timestamp corresponding to the transmit time generated by the adder 508.

The timestamping circuitry 500 outputs i) the packet that includes the timestamp (sometimes referred to herein as a "timestamped packet"), and ii) timing information. In an embodiment, the time stamping circuitry 500 outputs the timing information separately from the timestamped packet, e.g., via a first output of the time stamping circuitry 500, which is separate from a second output of the time stamping circuitry 500 that outputs the timestamped packet. In another embodiment, the timestamping circuitry 500 includes circuitry (not shown) that is configured to add the timing information to the packet, e.g., in a tag added to the packet, where the tag will be removed from the packet prior to transmitting the packet via the port of the network device so that the tag is not transmitted via the port. In an embodiment, the timestamping circuitry 500 includes circuitry (not shown) that is configured to add the timing information to a control header corresponding to the packet, e.g., a control header as described with reference to FIGS. 3A-C or another suitable control header. In an embodiment, the timestamping circuitry 500 includes circuitry (not shown) that is configured to add the control header to the packet. In another embodiment, the timestamping circuitry 500 outputs the control header separately from the packet.

In some embodiments, the time stamping circuitry 500 does not timestamp every packet that the time stamping circuitry 500 receives, e.g., the time stamping circuitry 500 selectively timestamps packets. For example, the packet processor 116, the packet generator/packet processing component 428 determines which packets are to be timestamped and informs the time stamping circuitry 500 of which packets are to be timestamped, according to an embodiment. Thus, in some embodiments, the time stamping circuitry 500 includes control circuitry (not shown) that receives timestamping control information corresponding to a packet and that indicates whether the packet is to be timestamped, and the control circuitry controls the time stamping circuitry 500 to selectively add a timestamp to the packet based on the timestamping control information. For example, when the timestamping control information indicates that the packet is to be timestamped, the control circuitry controls the time stamping circuitry 500 to include a timestamp in the packet as discussed above; on the other hand, when the timestamping control information indicates that the packet is not to be timestamped, the control circuitry controls the time stamping circuitry 500 to not include a timestamp in the packet.

In an embodiment, the time stamping circuitry 500 receives the timestamping control information separate from the packet but corresponding to the packet. In another embodiment, the timestamping control information is added to the packet, e.g., in a tag added to the packet, in a control header added to the packet, etc. In an embodiment in which the packet received by the time stamping circuitry 200 includes a tag/control header that indicates the packet is to be timestamped, the time stamping circuitry 500 modifies the tag/control header to include the transmit time in the tag/control header.

In an embodiment, when the timestamping control information indicates that the packet is not to be timestamped, the control circuitry (not shown) of the time stamping circuitry 500 sets the timing information to value so that the time gating circuitry 112/448 immediately releases the packet to the port 104/436. For example, when the timestamping control information indicates that the packet is not to be timestamped, the control circuitry (not shown) of the time stamping circuitry 500 sets the timing information to indicate the current time or a past time, according to an embodiment. In another embodiment, when the timestamping control information indicates that the packet is not to be timestamped, the control circuitry (not shown) of the time stamping circuitry 500 sets the timing information to a predetermined value that indicates to the time gating circuitry 112/448 that the time gating circuitry 112/448 should immediately release the packet to the port 104/436.

In some embodiments, the transmit time output by the timestamping circuitry 500 is adjusted with respect to the timestamp embedded in the packet. For example, to account for a known delay (e.g., a fixed, known delay) after the time gating circuitry 112/448 (e.g., including a fixed, known delay through the port 104/436), the timestamping circuitry 500 adjusts the transmit time output by the timestamping circuitry 500 to be earlier than the timestamp embedded in the packet to account for the known delay, e.g., through the port 104/436.

In other embodiments, the timestamping circuitry 500 does not adjust the transmit time output by the timestamping circuitry 500 with respect to the timestamp embedded in the packet.

Figure 6:
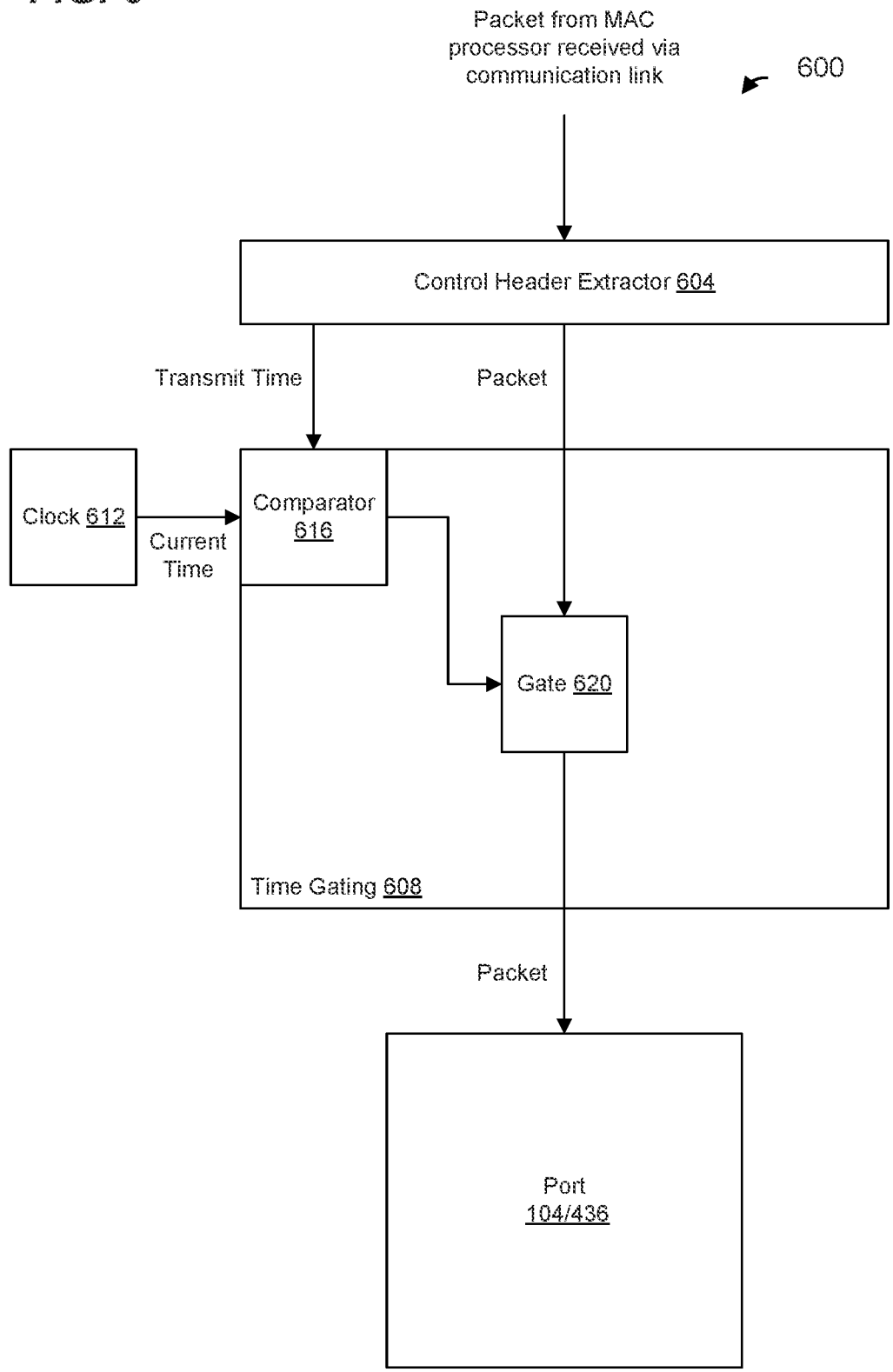
FIG. 6 is a diagram of example transmitter circuitry that is configured to selectively release a packet to a port for transmission, according to an embodiment.

FIG. 6 is a diagram of example PHY processor circuitry 600 that is configured to selectively release a packet to a port for transmission, according to an embodiment. The PHY processor circuitry 600 is included in the PHY processor 108 of FIG. 1, according to an embodiment. The PHY processor circuitry 600 is included in the PHY processor 408 of FIG. 4, according to another embodiment. In other embodiments, the PHY processor circuitry 600 is included in another PHY processor other than the PHY processor 108 of FIG. 1 and the PHY processor 408 of FIG. 4.

The PHY processor circuitry 600 includes control header extractor circuitry 604 that is configured to extract a control header from a packet received from a MAC processor (e.g., the MAC processor 136 of FIG. 1, the MAC processor 432 of FIG. 4, etc.) via a communication link (e.g., the communication link between the PHY processor 108 and the MAC processor 136 of FIG. 1, the communication link 412 of FIG. 4, etc.). The control header extractor circuitry 604 is configured to extract transmit time information from the control header, in an embodiment.

The PHY processor circuitry 600 also includes time gating circuitry 608 and a clock circuit 612. In an embodiment, the clock circuitry 612 corresponds to the clock circuitry 180 of FIG. 1. In another embodiment, the PHY processor circuitry 600 omits the clock circuitry 612 and receives a clock signal from clock circuitry external to the PHY processor circuitry 600.

The time gating circuitry 608 receives a current time value generated by the clock circuit 612 (or by clock circuitry external to the PHY processor circuitry 600). The time gating circuitry 608 also receives a packet and transmit time information from the control header extraction circuitry 604.

The time gating circuitry 604 includes a comparator circuit 616 that receives the transmit timing information (transmit time) and the current time and compares the current time to the transmit time. The comparator circuit 616 is configured to generate a control signal that indicates whether the current time has reached the transmit time and/or whether the time gating circuitry 600 is to release the packet to the port 104/436.

In an embodiment in which the time stamping circuitry 128/200 is configured to set the timing information (transmit time) to a predetermined value to indicate when a packet has not been timestamped, the comparator circuit 304 is configured to generate the control signal when the timing information (transmit time) is set to the predetermined value to indicate that the time gating circuitry 300 is to release the packet to the network interface 112. In an embodiment in which the time stamping circuitry 124/444 sets the timing information (transmit time) to the current/past time for a packet that has not been timestamped, the comparator circuit 616 will determine that the current time has already reached the transmit time and will thus generate the control signal to indicate that time gating circuitry 608 is to release the packet to the port 104/436.

The time gating circuitry 608 also includes a gate circuit 620. The gate circuit 620 is configured to selectively release the packet to the port 104/436 based on whether the current time has reached the transmit time for the packet. For example, in an embodiment, the gate circuit 620 is configured to selectively release the packet to the port 104/436 based on the control signal generated by the comparator circuit 616. In an embodiment, the gate circuit 620 is configured to i) hold the packet from proceeding to the port 104/436 prior to the current time reaching the transmit time, and ii) release the packet to the port 104/436 in response to the current time reaching the transmit time.

In an embodiment, the gate circuit 620 includes a memory device (not shown) for storing at least a portion of the packet received from the MAC processor. For example, the memory device (not shown) stores a portion of the packet while the packet is being held from proceeding to the port 104/436. As another example, the memory device (not shown) stores a portion and the gate circuit 620 reads the portion of the packet from the memory device in response to determining that the packet is to be released to the port 104/436. In an embodiment, the memory device of the gate circuit 62—comprises a buffer, a register, etc.

In another embodiment, the time gating circuitry 608 also includes a pause signal generator circuit (not shown) that is configured to selectively generate a pause signal for the MAC processor. In an embodiment, the pause signal prompts the MAC processor to stop providing packet data to the PHY processor 600. The pause signal generator circuit is configured to selectively generate the pause signal based on whether the current time has reached the transmit time for the packet. For example, in an embodiment, the pause signal generator circuit is configured to selectively generate the pause signal based on the control signal generated by the comparator circuit 616.

In an embodiment, the gate circuit 620 is configured to generate an additional control signal that indicates that the gate circuit 620 is not ready to receive additional packet data while the packet is being released to the port 104/436 because, for example, the gate circuit 620 has not completed reading data stored in the memory device of the gate circuit 620. The pause signal generator circuit (not shown) is configured to selectively generate the pause signal further based on the additional control signal generated by the gate circuit 620.

In operation, the time gating circuitry 608 i) receives the packet that is to be transmitted via the port 104/436, ii) receives the timing information (which indicates the transmit time for the packet) from the control header extraction circuitry 604, iii) holds the packet from proceeding to the port 104/436 prior to a current time reaching the transmit time, and iv) releases the packet to the port 104/436 in response to the current time reaching the transmit time, according to an embodiment. Because the time gating circuitry 608 releases the packet to the port 104/436 when the current time reaches the transmit time (which corresponds to the timestamp in the packet), the timestamp in the packet more accurately reflects the actual transmit time of the packet.

In another embodiment in which the time gating circuitry 608 also receives timestamping control information (such as described above), and when the timestamping control information indicates that the packet is not to be timestamped, control circuitry (not shown) of the time gating circuitry 608 generates a control signal that causes the gate circuit 620 to immediately release the packet to the port 104/436.

In some embodiments, the time gating circuitry 608 adjusts the transmit time received from the control header extraction circuitry 604 with respect to the timestamp embedded in the packet. For example, to account for a known delay (e.g., a fixed, known delay) after the time gating circuitry 608 (e.g., including a fixed, known delay through the port 104/436), the time gating circuitry 608 adjusts the transmit time received from the control header extraction circuitry 604 to be earlier than the timestamp embedded in the packet to account for the known delay, e.g., through the port 104/436.

In other embodiments, the time gating circuitry 608 does not adjust the transmit time received from the control header extraction circuitry 604.

Figure 7:
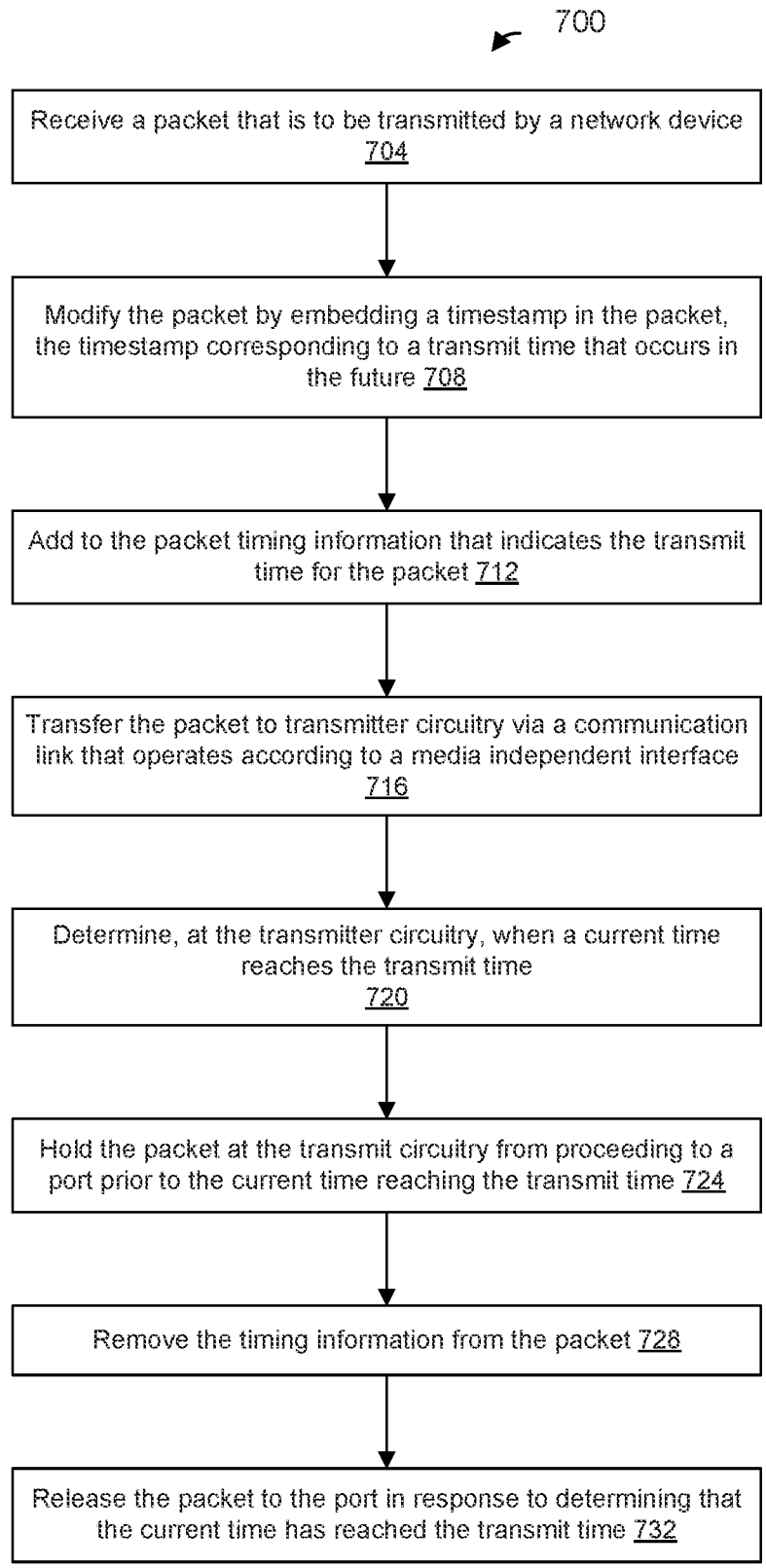
FIG. 7 is a flow diagram of an example method for transmitting timestamped packets in a network, according to an embodiment.

FIG. 7 is a flow diagram of an example method 700 for transmitting timestamped packets, according to an embodiment. The method 700 is implemented by the network device 100 of FIG. 1 or the network device 400 of FIG. 4, in some embodiments, and the method 700 is described with reference to FIGS. 1 and 4 for ease of explanation. In other embodiments, the method 700 is implemented by another suitable network device different than the network devices 100 and 400 of FIGS. 1 and 4. Similarly, a portion of the method 700 is implemented by the timestamping circuitry 500 of FIG. 5, in some embodiments, and the method 700 is described with reference to FIG. 5 for ease of explanation. In other embodiments, the method 700 is implemented using other suitable timestamping circuitry different than the timestamping circuitry 500 of FIG. 5. Similarly, a portion of the method 700 is implemented by the PHY processing circuitry 600 of FIG. 6, in some embodiments, and the method 700 is described with reference to FIG. 6 for ease of explanation. In other embodiments, the method 700 is implemented using other suitable PHY processing circuitry different than the PHY processing circuitry 600 of FIG. 6.

At block 704, timestamping circuitry of a packet processor of a network device receives a packet that is to be transmitted via a port of the network device. For example, the timestamping circuitry 128 (FIG. 1) receives a packet that is to be transmitted via a port 104, according to an embodiment. As another example, the timestamping circuitry 444 (FIG. 4) receives a packet that is to be transmitted via the port 436, according to an embodiment. As yet another example, the timestamping circuitry 500 (FIG. 5) receives a packet that is to be transmitted via a port, according to another embodiment.

At block 708, the timestamping circuitry modifies the packet by embedding a timestamp in the packet. The timestamp corresponding to a transmit time at which the packet is to be transmitted by the port, where the transmit time occurs after the timestamping circuitry embeds the timestamp in the packet. For example, the timestamping circuitry 128 (FIG. 1) adds a timestamp to the packet, according to an embodiment. As another example, the timestamping circuitry 444 (FIG. 4) adds the timestamp to the packet, according to an embodiment. As yet another example, the timestamping circuitry 500 (FIG. 5) adds the timestamp to the packet, according to another embodiment.

In some embodiments, the network device generates timing information, separate from the timestamp in the packet, that indicates the transmit time corresponding to the timestamp in the packet. For example, the timestamping circuitry 128 (FIG. 1) generates the timing information, according to an embodiment. As another example, the timestamping circuitry 444 (FIG. 4) generates the timing information, according to an embodiment. As yet another example, the timestamping circuitry 500 (FIG. 5) generates the timing information, according to another embodiment.

At block 712, the packet processor adds the timing information to the packet. For example, the timestamping circuitry 128 (FIG. 1) adds the timing information to the packet, according to an embodiment. As another example, the timestamping circuitry 444 (FIG. 4) adds the timing information to the packet, according to an embodiment. As yet another example, the timestamping circuitry 500 (FIG. 5) adds the timing information to the packet, according to another embodiment. As yet another example, the MAC processor 136 adds the timing information to the packet, according to another embodiment. As another example, the MAC processor 432 adds the timing information to the packet, according to another embodiment.

In an embodiment, the timing information is included in a control header, which is added to the packet.

At block 716, the packet processor transfers the packet to transmitter circuitry of the network device via a communication link between the packet processor and the transmitter circuitry. In an embodiment, the communication link is a serial communication link. In an embodiment, the communication link operates according to a media independent interface, such as USXGMII, USGMII, etc. In an embodiment, the packet transferred at block 716 includes the timing information added to the packet at block 712.

As an example, the MAC processor 136 transfers the packet to the PHY processor 108 using the SERDES 140, in an embodiment. As another example, the MAC processor 432 transfers the packet to the PHY processor 408 using the SERDES 416, in another embodiment.

At block 720, the transmitter circuitry determines when a current time reaches the transmit time. In an embodiment, the current time is generated by a clock circuit of, or coupled to, the transmitter circuitry. For example, the time gating circuitry 112 (FIG. 1) receives the timing information that indicates the transmit time, and determines when a current time (as measured by the clock 180) reaches the transmit time, according to an embodiment. As another example, the time gating circuitry 448 (FIG. 4) receives the timing information that indicates the transmit time, and determines when the current time reaches the transmit time, according to an embodiment. As yet another example, the time gating circuitry 608 (FIG. 6) receives the timing information that indicates the transmit time, and determines when the current time (as measured by the clock 612) reaches the transmit time, according to another embodiment. For instance, the comparator circuit 616 (FIG. 6) receives i) the current time, and ii) the timing information that indicates the transmit time, and the comparator circuit 616 determines when the current time reaches the transmit time, according to another embodiment.

In an embodiment, the method 700 further comprises the transmitter circuitry extracting the timing information from the packet that was received via the communication link. For example, the control header extractor 604 (FIG. 6) extracts the timing information from the packet that was received via the communication link, in an embodiment.

At block 724, time gating circuitry of the transmitter circuitry holds the packet from proceeding to the port prior to the current time reaching the transmit time. For example, the time gating circuitry 112 (FIG. 1) holds the packet from proceeding to the port 104 prior to the current time reaching the transmit time, according to an embodiment. As another example, the time gating circuitry 448 (FIG. 4) holds the packet from proceeding to the port 436 prior to the current time reaching the transmit time, according to an embodiment. As yet another example, the gating circuitry 620 (FIG. 6) holds the packet from proceeding to the port 104/436 prior to the current time reaching the transmit time, according to another embodiment.

At block 728, the transmitter circuitry removes the timing information added to the packet at block 712. For example, the PHY processor 108 removes the timing information, in an embodiment. As another example, the time gating circuitry 112 removes the timing information, in another embodiment. As another example, the PHY processor 408 removes the timing information, in another embodiment. As yet another example, the time gating circuitry 448 removes the timing information, in another embodiment. In some embodiments in which the timing information is included in a control header, which is added to the packet in conjunction with block 712, removing the timing information at block 728 is performed when the transmitter circuitry removes the control header from the packet.

In some embodiments, the timing information is removed at block 728 before or while holding the packet at block 724. In other embodiments, the timing information is removed at block 728 after holding the packet at block 724, e.g., the timing information is removed at block 728 in conjunction with releasing the packet to the port.

At block 732, the time gating circuitry of the transmitter circuitry releases the packet, which omits the timing information that was removed at block 728, to the port in response to determining that the current time has reached the transmit time so the packet is transmitted via the port without the timing information. In some embodiments in which the timing information is included in a control header, which is added to the packet in conjunction with block 712, the packet, which omits the control header that was removed in conjunction with performing block 728, is released to the port at block 732 so that the packet is transmitted via the port without the control header. For example, the time gating circuitry 112 (FIG. 1) releases the packet to the port 104 in response to determining that the current time reached the transmit time, according to an embodiment. As another example, the time gating circuitry 448 (FIG. 4) releases the packet to the port 436 in response to determining that the current time reached the transmit time, according to an embodiment. As yet another example, the gating circuitry 620 (FIG. 6) releases the packet to the port 104/436 in response to determining that the current time reached the transmit time, according to another embodiment.

In an embodiment, the method 700 further includes processing the packet, by one or more circuitry stages, after modifying the packet to embed the timestamp in the packet at block 708. In an embodiment, processing the packet, by one or more circuitry stages, after modifying the packet to embed the timestamp includes generating authentication information using contents of the packet, including the timestamp embedded in the packet. In an embodiment, processing the packet, by one or more circuitry stages, after modifying the packet to embed the timestamp further includes embedding the authentication information in the packet.

In another embodiment, processing the packet, by one or more circuitry stages, after modifying the packet includes encrypting contents of the packet, including the timestamp embedded in the packet.

Embodiment 1: A network device, comprising: a packet processor that includes timestamp circuitry configured to modify a packet that is to be transmitted by the network device by embedding a future timestamp in the packet to generate a timestamped packet, the future timestamp corresponding to a transmit time at which the timestamped packet is to be transmitted by the network device, the transmit time occurring after the timestamp circuitry embeds the future timestamp in the packet, the packet processor being configured to add to the timestamped packet timing information that indicates the transmit time corresponding to the future timestamp; and transmitter circuitry coupled to the packet processor via a communication link that operates according to a media independent communication interface, the transmitter circuitry being configured to receive packets from the packet processor via the communication link and transmit the packets via the one or more network links, the packets including the timestamped packet with the timing information that indicates the transmit time corresponding to the future timestamp. The transmitter circuitry includes time gating circuitry that is configured to i) hold the timestamped packet from proceeding to one of the network links, among the one or more network links, prior to a current time reaching the transmit time, and ii) release the timestamped packet for transmission via the one network link in response to the current time reaching the transmit time.

Embodiment 2: The network device of embodiment 1, wherein the packet processor is configured to add the timing information to the timestamped packet so that the timing information can be transferred, within the packet, to the transmitter circuitry via the communication link that operates according to the media independent interface.

Embodiment 3: The network device of either of embodiments 1 or 2, wherein the communication link is a serial communication link.

Embodiment 4: The network device of embodiment 3, further comprising: a serializer-deserializer (SERDES) coupled to the packet processor; wherein the packet processor is configured to transfer packets to the transmit circuitry via the serial communication link using the SERDES.

Embodiment 5: The network device of any of embodiments 1-4, wherein packet processor is further configured to, in response to determining that the network device is to hold transmission of the timestamped packet until the transmit time: determine a delay for providing a subsequent packet to the transmitter circuitry via the communication link; and after the delay, provide the subsequent packet to the transmitter circuitry via the communication link.

Embodiment 6: The network device of any of embodiments 1-5, wherein: the packet processor is further configured to: i) add a control header to the packet or the timestamped packet, and ii) add the timing information that indicates the transmit time to the control header; and the transmitter circuitry is configured to: i) extract the timing information from the timestamped packet, and ii) use the timing information to determine the transmit time.

Embodiment 7: The network device of embodiment 6, wherein the transmitter circuitry is further configured to: remove the control header from the timestamped packet so that the timestamped packet is transmitted via the port without the control header.

Embodiment 8: The network device of embodiment 6, wherein the packet processor is further configured to: add the control header to a preamble of the timestamped packet.

Embodiment 9: The network device of any of embodiments 1-8, wherein the packet processor further comprises: encryption circuitry that is configured to encrypt contents of the timestamped packet, including the future timestamp.

Embodiment 10: The network device of any of embodiments 1-8, wherein the packet processor further comprises: authentication circuitry that is configured to generate authentication information using contents of the timestamped packet, including the future timestamp.

Embodiment 11: The network device of any of embodiments 1-10, wherein the network device further comprises: first clock circuitry configured to generate a first clock signal; and second clock circuitry configured to generate a second clock signal; wherein the timestamp circuitry is configured to determine the future timestamp using the first clock signal; and wherein the time gating circuitry is configured to determine when the current time reaches the transmit time using the second clock signal.

Embodiment 12: A method for transmitting packets in a network device, the method comprising: receiving, at a packet processor of a network device, a packet that is to be transmitted via a port of the network device; modifying, with timestamping circuitry of the packet processor, the packet by embedding a future timestamp in the packet to generate a timestamped packet, the future timestamp corresponding to a transmit time at which the timestamped packet is to be transmitted by the port, the transmit time occurring after the timestamping circuitry embeds the future timestamp in the packet; adding, by the packet processor, timing information to the timestamped packet, the timing information indicating the transmit time; transferring the timestamped packet from the packet processor to transmitter circuitry via a communication link that operates according to a media independent communication interface; determining, at the transmitter circuitry, when a current time reaches the transmit time; holding, at time gating circuitry of the transmitter circuitry, the packet from proceeding to the port prior to the current time reaching the transmit time; and releasing, by the time gating circuitry, the packet to the port in response to determining that the current time has reached the transmit time.

Embodiment 13: The method for transmitting packets of embodiment 12, wherein adding the timing information to the timestamped packet comprises adding the timing information to the timestamped packet so that the timing information can be transferred, within the packet, to the transmitter circuitry via the communication link that operates according to the media independent interface.

Embodiment 14: The method for transmitting packets of either of embodiment 12 or 13, wherein transferring the timestamped packet from the packet processor to the transmitter circuitry comprises: transferring the timestamped packet from the packet processor to the transmitter circuitry via a serial communication link.

Embodiment 15: The method for transmitting packets of embodiment 14, wherein transferring the timestamped packet from the packet processor to transmitter circuitry comprises: transferring the timestamped packet from the packet processor to the transmitter circuitry using a serializer-deserializer (SERDES) coupled to the packet processor.

Embodiment 16: The method for transmitting packets of any of embodiments 12-15, further comprising, in response to determining that the network device is to hold transmission of the timestamped packet until the transmit time: determining a delay for providing a subsequent packet to the transmitter circuitry via the communication link; and after the delay, providing the subsequent packet to the transmitter circuitry via the communication link.

Embodiment 17: The method for transmitting packets of any of embodiments 12-16, further comprising: adding, by the packet processor, a control header to the packet or the timestamped packet; adding, by the packet processor, the timing information that indicates the transmit time to the control header; extracting, by transmitter circuitry, the timing information from the timestamped packet; and using, by transmitter circuitry, the timing information to determine the transmit time.

Embodiment 18: The method for transmitting packets of embodiment 17, further comprising: removing, by transmitter circuitry, the control header from the timestamped packet so that the timestamped packet is transmitted via the port without the control header.

Embodiment 19: The method for transmitting packets of embodiment 17, wherein adding the control header to the packet or the timestamped packet comprises: adding the control header to a preamble of the timestamped packet.

Embodiment 20: The method for transmitting packets of any of embodiments 12-19, further comprising: encrypting, by encryption circuitry of the packet processor, contents of the timestamped packet, including the future timestamp.

Embodiment 21: The method for transmitting packets of any of embodiments 12-19, further comprising: generating, by authentication circuitry of the packet processor, authentication information using contents of the timestamped packet, including the future timestamp.

Embodiment 22: The method for transmitting packets of any of embodiments 12-16, further comprising: determining, by the timestamp circuitry of the packet processor, the future timestamp using a first clock signal generated by first clock circuitry; and determining, by the time gating circuitry of the transmitter circuitry, when the current time reaches the transmit time using a second clock signal generated by second clock circuitry.

At least some of the various blocks, operations, and techniques described above are suitably implemented utilizing dedicated hardware, such as one or more of discrete components, an integrated circuit, an ASIC, a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as in a random access memory (RAM), a read-only memory (ROM), a solid state memory, etc. The software or firmware instructions may include machine readable instructions that, when executed by one or more processors, cause the one or more processors to perform various acts described herein.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a serializer-deserializer (SERDES); and
a packet processor coupled to the SERDES, the packet processor including timestamp circuitry configured to modify a packet that is to be transmitted by the network device by embedding a future timestamp in the packet to generate a timestamped packet, the future timestamp corresponding to a transmit time at which the timestamped packet is to be transmitted by the network device, the transmit time occurring after the timestamp circuitry embeds the future timestamp in the packet, the packet processor being configured to:
add to the timestamped packet timing information that indicates the transmit time corresponding to the future timestamp, and
transfer packets, including the timestamped packet with the timing information, to transmitter circuitry via the SERDES and a communication link coupled to the SERDES, the communication link operating according to a media independent communication interface;
the network device further comprising the transmitter circuitry coupled to the SERDES via the communication link, the transmitter circuitry being configured to receive packets from the packet processor via the SERDES and the communication link and transmit the packets via the one or more network links, the packets including the timestamped packet with the timing information that indicates the transmit time corresponding to the future timestamp, the transmitter circuitry including:
time gating circuitry that is configured to i) hold the timestamped packet from proceeding to one of the network links, among the one or more network links, prior to a current time reaching the transmit time, and ii) release the timestamped packet for transmission via the one network link in response to the current time reaching the transmit time.

2. The network device of claim 1, wherein the packet processor is configured to add the timing information to the timestamped packet so that the timing information can be transferred, within the packet, to the transmitter circuitry via the SERDES and the communication link that operates according to the media independent interface.

3. The network device of claim 1, wherein packet processor is further configured to, in response to determining that the network device is to hold transmission of the timestamped packet until the transmit time:
determine a delay for providing a subsequent packet to the transmitter circuitry via the communication link; and after the delay, provide the subsequent packet to the transmitter circuitry via the SERDES and the communication link.

4. The network device of claim 1, wherein:
the packet processor is further configured to: i) add a control header to the packet or the timestamped packet, and ii) add the timing information that indicates the transmit time to the control header; and
the transmitter circuitry is configured to: i) extract the timing information from the timestamped packet, and ii) use the timing information to determine the transmit time.

5. The network device of claim 4, wherein the transmitter circuitry is further configured to:
remove the control header from the timestamped packet so that the timestamped packet is transmitted via the port without the control header.

6. The network device of claim 4, wherein the packet processor is further configured to:
add the control header to a preamble of the timestamped packet.

7. The network device of claim 1, wherein the packet processor further comprises:
encryption circuitry that is configured to encrypt contents of the timestamped packet, including the future timestamp.

8. The network device of claim 1, wherein the packet processor further comprises:
authentication circuitry that is configured to generate authentication information using contents of the timestamped packet, including the future timestamp.

9. The network device of claim 1, wherein the network device further comprises:
first clock circuitry configured to generate a first clock signal; and
second clock circuitry configured to generate a second clock signal;
wherein the timestamp circuitry is configured to determine the future timestamp using the first clock signal; and
wherein the time gating circuitry is configured to determine when the current time reaches the transmit time using the second clock signal.

10. A method for transmitting packets in a network device, the method comprising:
receiving, at a packet processor of a network device, a packet that is to be transmitted via a port of the network device;
modifying, with timestamping circuitry of the packet processor, the packet by embedding a future timestamp in the packet to generate a timestamped packet, the future timestamp corresponding to a transmit time at which the timestamped packet is to be transmitted by the port, the transmit time occurring after the timestamping circuitry embeds the future timestamp in the packet;
adding, by the packet processor, timing information to the timestamped packet, the timing information indicating the transmit time;
transferring the timestamped packet with the timing information from the packet processor to transmitter circuitry via a serializer-deserializer (SERDES) and a communication link coupled to the SERDES, the communication link operating according to a media independent communication interface;
determining, at the transmitter circuitry, when a current time reaches the transmit time;
holding, at time gating circuitry of the transmitter circuitry, the packet from proceeding to the port prior to the current time reaching the transmit time; and
releasing, by the time gating circuitry, the packet to the port in response to determining that the current time has reached the transmit time.

11. The method for transmitting packets of claim 10, wherein adding the timing information to the timestamped packet comprises adding the timing information to the timestamped packet so that the timing information can be transferred, within the packet, to the transmitter circuitry via the SERDES and the communication link that operates according to the media independent interface.

12. The method for transmitting packets of claim 10, further comprising, in response to determining that the network device is to hold transmission of the timestamped packet until the transmit time:
determining a delay for providing a subsequent packet to the transmitter circuitry via the communication link; and
after the delay, providing the subsequent packet to the transmitter circuitry via the communication link.

13. The method for transmitting packets of claim 10, further comprising:
adding, by the packet processor, a control header to the packet or the timestamped packet;
adding, by the packet processor, the timing information that indicates the transmit time to the control header;
extracting, by transmitter circuitry, the timing information from the timestamped packet; and
using, by transmitter circuitry, the timing information to determine the transmit time.

14. The method for transmitting packets of claim 13, further comprising:
removing, by transmitter circuitry, the control header from the timestamped packet so that the timestamped packet is transmitted via the port without the control header.

15. The method for transmitting packets of claim 13, wherein adding the control header to the packet or the timestamped packet comprises:
adding the control header to a preamble of the timestamped packet.

16. The method for transmitting packets of claim 10, further comprising:
encrypting, by encryption circuitry of the packet processor, contents of the timestamped packet, including the future timestamp.

17. The method for transmitting packets of claim 10, further comprising:
generating, by authentication circuitry of the packet processor, authentication information using contents of the timestamped packet, including the future timestamp.

18. The method for transmitting packets of claim 10, further comprising:
determining, by the timestamp circuitry of the packet processor, the future timestamp using a first clock signal generated by first clock circuitry; and
determining, by the time gating circuitry of the transmitter circuitry, when the current time reaches the transmit time using a second clock signal generated by second clock circuitry.

* * * * *